United States Patent
Koch et al.

(10) Patent No.: US 10,606,962 B2
(45) Date of Patent: Mar. 31, 2020

(54) HORIZONTAL OPTIMIZATION OF TRANSPORT ALIGNMENTS

(71) Applicant: Autodesk, Inc., San Rafael, CA (US)

(72) Inventors: Valentin R. Koch, Kelowna (CA); Song Liu, Shanghai (CN)

(73) Assignee: AUTODESK, INC., San Rafael, CA (US)

( * ) Notice: Subject to any disclaimer, the term of this patent is extended or adjusted under 35 U.S.C. 154(b) by 981 days.

(21) Appl. No.: 14/530,009

(22) Filed: Oct. 31, 2014

(65) Prior Publication Data
US 2015/0154323 A1 Jun. 4, 2015

Related U.S. Application Data

(60) Provisional application No. 61/910,704, filed on Dec. 2, 2013.

(51) Int. Cl.
*G06F 17/50* (2006.01)

(52) U.S. Cl.
CPC ...... *G06F 17/5004* (2013.01); *G06F 2217/06* (2013.01); *G06F 2217/08* (2013.01)

(58) Field of Classification Search
CPC ............. G06F 17/5004; G06F 2217/08; G06F 2217/06
See application file for complete search history.

(56) References Cited

U.S. PATENT DOCUMENTS

| | | | | |
|---|---|---|---|---|
| 6,996,507 B1 * | 2/2006 | Myr | ..................... | G06F 17/5004 172/1 |
| 2013/0080124 A1 * | 3/2013 | Koch | .................. | G06F 17/5004 703/1 |
| 2014/0200864 A1 | 7/2014 | Bauschke et al. | | |

OTHER PUBLICATIONS

Shafahi et al. "A Customized Particle Swarm Method to Solve Highway Alignment Optimization Problem" First Published Jul. 10, 2012, Reprint Jan. 2013, p. 52-67.*
Hansen et al. "Reducing the Time Complexity of the Derandomized Evolution Stategy with CMA-ES" Spring 2003, p. 1-18.*
Lai, Xiaorong "Optimization of Station Locations and Track Alignments for Rail Transit Lines," University of Maryland, 232 pages. (Year: 2012).*
Smith et al.,"Deternnination of Gradient and Curvature Constrained Optimal Paths," 2006, Computer Aided Civil and Infrastructure Engineering, 16 pages (Year: 2006).*
"American Association of State Highway and Transportation Officials, a Policy on Geometric Design of Highways and Streets", 4th edition, Washington, D.C., 2001.

(Continued)

*Primary Examiner* — Doon Y Chow
*Assistant Examiner* — Carina Yun
(74) *Attorney, Agent, or Firm* — Gates & Cooper LLP

(57) ABSTRACT

A method, apparatus, system, article of manufacture, and computer program product provide the ability to optimize a transport alignment. Terrain data, constraint data, and cost data are read. Terrain pixels having elevation values are organized and stored in a first grid structure with rows and columns that enable efficient access to each terrain pixel. One or more raster layers of a same dimension and orientation as the first grid structure are created. A starting alignment is obtained. The starting alignment is then optimized using the one or more raster layers.

33 Claims, 13 Drawing Sheets

(56) References Cited

OTHER PUBLICATIONS

[Bauschke, H. H., et al., "Projection Methods: Swiss Army Knives for Solving Feasibility and Best Approximation Problems with Halfspaces", Proceedings of the Workshop on Infinite Products of Operators and Their Applications, May 21-24, 2012, at the Technion-Israel Institute of Technology, Haifa Israel.] Published in the book: "Infinite Products of Operators and Their Applications", PTechnion Israel Institute of Technology, Haifa, Israel, pp. 1-40, Apr. 2015.

Bellman, R., "On the Approximation of Curves by Line Segments Using Dynamic Programming", Communications of the ACM, vol. 4, Issue 6, p. 284, Jun. 1961.

Cheng, J., et al., "Model for Three-Dimensional Highway Alignment", Journal of Transportation Engineering, ASCE, Dec. 2006.

Chew, E. P., et al., "Simultaneous Optimization of Horizontal and Vertical Alignments for Highways", Transportation Research, 23B, No. 5, pp. 315-329, 1989.

Dijkstra, E. W., "A Note on Two Problems in Connexion with Graphs", Numerische Mathematik 1, pp. 269-271, 1959.

Douglas, D. H., et al., "Algorithms for the Reduction of the Number of Points Required to Represent a Digitized Line or its Caricature", The Canadian Cartographer: The International Journal for Geographic Information and Geovisualization, vol. 10, No. 2, pp. 112-122, Dec. 1973.

Gipps, P. G., et al., "New technologies for transport route selection", Transportation Research Part C: Emerging Technologies, 9 (2): 135-154, 2001.

Jha, M. K., et al., "A highway alignment optimization model using geographic information systems", Transportation Research Part A: Policy and Practice, 38(6): 455-481, 2004.

Jha, M. K., et al., "Highway Route Optimization Based on Accessibility, Proximity, and Land-Use Changes", Journal of Transportation Engineering, ASCE, 132 (5): 435-439, May 1, 2006.

Jong, J., et al., "Preliminary Highway Design with Genetic Algorithms and Geographic Information Systems", Computer-Aided Civil and Infrastructure Engineering, 15: 261-271, 2000.

Jong, J. C., et al., "An evolutionary model for simultaneously optimizing three-dimensional highway alignments", Transportation Research Part B: Methodological, 37: 107-128, 2003.

Kim, E., et al., "Improving the computational efficiency of highway alignment optimization models through a stepwise genetic algorithms approach", Transportation Research Part B: Methodological, 39 (4): 339-360, 2005.

Kung, H. T., "On Finding the Maxima of a Set of Vectors", Journal of the ACM, vol. 22, No. 4 pp. 469-476, Oct. 1975.

Lee, Y, "An Optimization Method for Designing the Highway Horizontal Alignment", Computing in Civil Engineering, 261 (1): 1-8, 2007.

Lee, Y., et al., "Optimization Method for Highway Horizontal Alignment Design", Journal of Transportation Engineering, 135 (4): 217, Apr. 2009.

Nobrega, R. A. A., et al., "Bridging decision-making process and environmental needs in corridor planning", Management of Environmental Quality: An International Journal, vol. 20, No. 6, pp. 622-637, 2009.

Trietsch, D., "A Family of Methods for Preliminary Highway Alignment", Transportation Science, vol. 21, No. 1, pp. 17-25, Feb. 1987.

* cited by examiner

*l* Sample line distance
$w_r$ Road width
$w_d$ Datum width

*l* Sample line distance
$w_r$ Road width
$t_w$ Wall thickness
$h$ Pylon height
$w_p$ Pylon width
$d$ Pylon depth
$w_f$ Spread footing width
$t_f$ Spread footing thickness

*l* Sample line distance
$w_r$ Road width
*h* Ceiling height
$t_w$ Wall thickness

HORIZONTAL OPTIMIZATION OF TRANSPORT ALIGNMENTS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/910,704, filed on Dec. 2, 2013, by Valentin R. Koch, entitled "Horizontal Optimization of Transport Alignments."

This application is related to the following co-pending and commonly-assigned patent application, which application is incorporated by reference herein:

U.S. patent application Ser. No. 13/626,451, filed on Sep. 25, 2012, by Valentin R. Koch, entitled "Road Design Optimization", which application claims the benefit under 35 U.S.C. Section 119(e) of U.S. Provisional Application Ser. No. 61/539,793, filed on Sep. 27, 2011, by Valentin R. Koch, entitled "ROAD DESIGN OPTIMIZATION."

BACKGROUND OF THE INVENTION

1. Field of the Invention

The present invention relates generally to road design, and in particular, to a method, apparatus, and article of manufacture for determining an optimal alignment for any cleared transportation path capable of allowing a vehicle to pass.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The geometric design of a transport alignment for any cleared transportation path capable of allowing a vehicle to pass is a crucial part in civil engineering infrastructure projects and corridor planning. Once fixed, the design determines largely the construction costs, land cost, as well as future operation and maintenance costs, and environmental impact. It is therefore crucial for a planner to find an optimal transport alignment.

The geometric design of a transport alignment is traditionally done in two stages: the horizontal alignment design and the vertical profile design. The horizontal alignment is the alignment trajectory from a satellite's eye view. The vertical profile is a two dimensional view of the elevation points of the stretched-out horizontal alignment. In [17], a described method finds an optimal vertical profile for a road alignment. Embodiments of the present invention focus on a new method to find an optimal horizontal alignment for any transport path, using elements from [17].

Early attempts at horizontal alignment optimization were based on the technique of dynamic programing. In 1987, Trietsch [22] examined different types of graph data structures in combination with Dijkstra's shortest path method [7].

In 1989, Chew et. al. [6] presented a method that used a three dimensional spline model to combine horizontal and vertical highway alignments. Chew solved the model with standard nonlinear constraint optimization techniques from the calculus of variations.

A research group around Jong, Jha, and Schonfeld [13] presented a method in 2000, to optimize preliminary highway designs with genetic algorithms using data from geographic information systems (GIS).

Peter Gipps [9] published a paper in 2001, presenting parts of the method created by Quantm International, Inc. to optimize rail and road alignments. Quantm International, Inc. and its subsidiary Quantm Ltd. of Australia, were acquired in 2006 by Trimble Navigation Ltd., which offers the method as a road and railway alignment optimization software solution.

In 2003, Jong and Schonfeld [14] presented an improved method using an evolutionary model for simultaneously optimizing three-dimensional highway alignments, followed by another paper by Jha and Schonfeld [10] that includes GIS data.

Further publications in 2006 by Jha et. al. [16, 11] improved on the computational efficiency of the genetic algorithms approaches and added more cost factors like proximity, and land-use changes.

Cheng and Lee [5] used a local neighborhood heuristic to optimize three-dimensional highway alignments in 2006.

Jha and Schonfeld published a book about Intelligent Road Design [12] in 2006, outlining their genetic algorithm approach in detail.

Schonfeld and Kang experimented with different approaches using feasible gates method in 2007 [15].

Also in 2007, Lee et. al. presented their own heuristic method [19] to optimize the horizontal alignment of a highway, with a follow-up paper in 2009 [20].

SUMMARY OF THE INVENTION

Embodiments of the invention provide an automated method for planners that need to find an optimal alignment for any cleared transportation path capable of allowing a vehicle to pass. The input to the method may include but is not limited to terrain data, starting and end points for the path or a complete starting alignment, design constraints, geographical information data such as avoidance zones, water bodies, land use, environmental sensitive areas, existing infrastructures such as roads, railways, buildings, and user preferences and rankings (weights). The method also requires some cost input that may include earthwork costs, construction costs, land costs, environmental costs, etc. The method then searches for an alignment that tries to minimize the costs, or any combination of costs, while respecting the given constraints.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
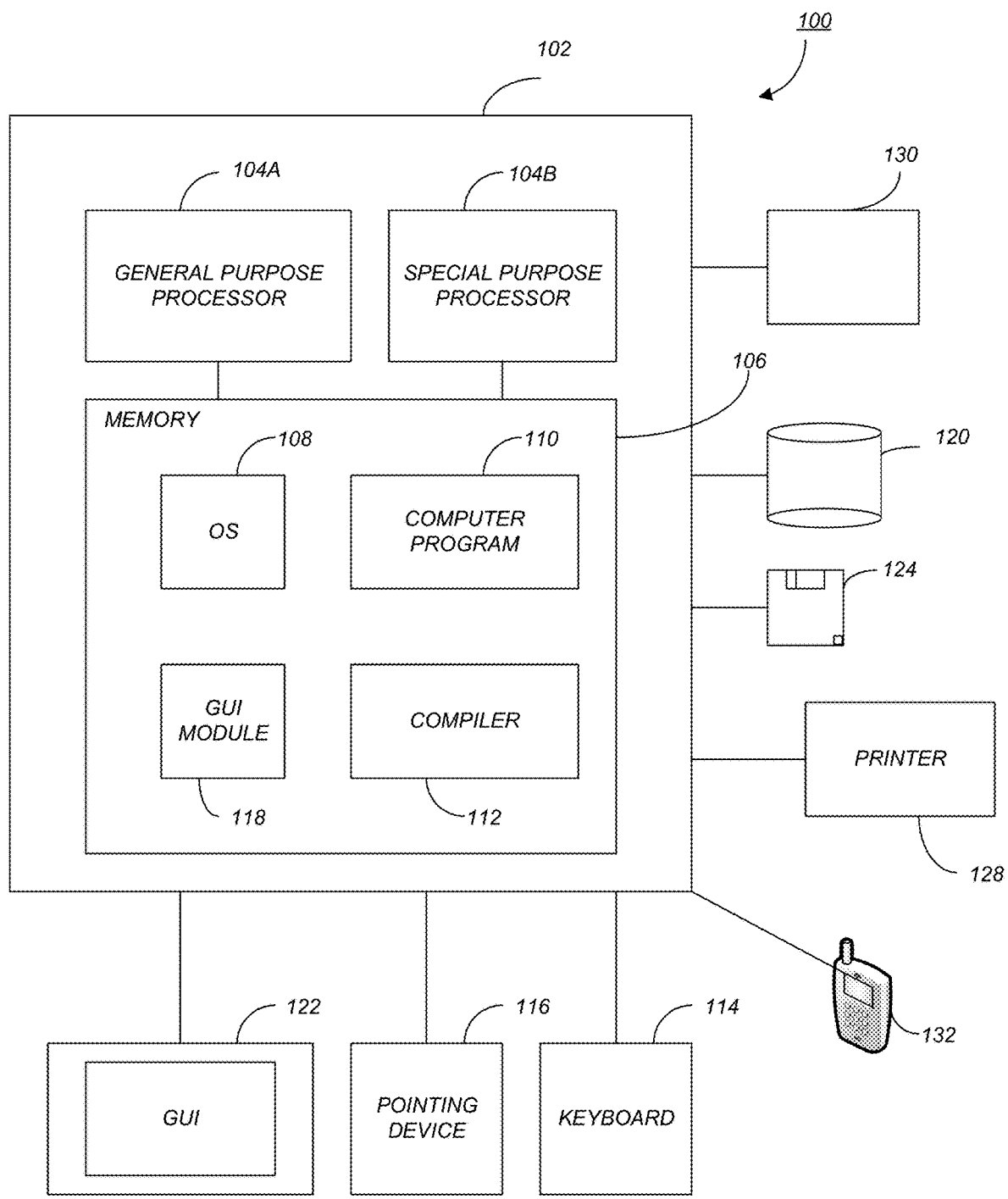
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention start by reading the terrain data, constraint data, and cost data. The method keeps the terrain pixels (elevation values) in memory, stored as a combination of rows and columns, that allow for efficient access to each pixel. The method then creates an additional raster layer of the same dimension and orientation, that contains the water data. Similar layers are added for avoidance zones. The method can add as many layers as necessary, including layers for hard costs and soft costs. As used herein, hard costs are defined as costs that can be quantified in monetary values (e.g. land cost), and soft costs include all other costs (e.g. environment, noise, etc). A more detailed definition is set forth below.

If instead of a starting alignment, a start and end point is provided, the method obtains a starting alignment as follows. The method produces another, coarser grid over the terrain grid, that contains edges that connect the grid points horizontally, vertically, and diagonally. For each edge, the method then computes the costs that would corresponds to an alignment segment that connects the two grid points for the edge. The cost computation may include but is not limited to earthwork and construction costs as described in [17], and any weighted and scaled combination of the values from the stored cost layers that lay under the path, or portions of the path, of the alignment segment. The method then calls a shortest-path method, such as Dijkstra's method [7], to find a the cheapest path on the grid.

An alignment consists usually of tangents that connect at Points of Intersections (PI). Curves with minimum radius need to be placed at these PIs to allow for smooth direction change for the vehicles. As the grid path consists of many small line segments that align or intersect, it may violate design constraints and is not suitable as an alignment. The method then calls two different processes to reduce the number of line segments. It calls these processes repeatedly, until it can successfully fit curves with a given minimum radius between the tangents. One process is the Segmented Least Squares method, and the other is the Douglas-Peucker method. Both processes are explained in [17]. Once both processes are completed with their alignment, embodiments of the invention may use the vertical optimization invention from [17] to obtain the earthwork and construction costs for the alignments. In addition it may add any other weighted and scaled combination of costs from the cost layers that lay in the path of the alignments. The cheaper alignment is then selected as the starting alignment.

Embodiments of the invention take the starting alignment as input for any deterministic or stochastic, derivative-free optimization process. Specifically, embodiments may use the Covariance Matrix Adaptation Evolution Strategy (CMA-ES), or any other Evolutionary Strategy. To compute the cost of the starting alignment for the optimization process, the method projects it along the centerline onto the original surface grid. The method reads the points where the tangents intersect with the grid and stores the elevation values to produce a profile. The method also produces offset profiles to the left and right of the centerline, to obtain elevation information within a wider range of the alignment. Each time the method reads elevation values, it also reads the cost values from the other cost layers. The profiles are then used to call the vertical optimization method described in [17], or parts of it, to obtain earthwork and construction costs. The method may also use the information from the other layers to add any other weighted and scaled combination of costs that lay in the path of the alignment. The optimization process then changes the PI configurations according to chosen strategy, and evaluates the cost of new road alignment in the same way as for the starting alignment. The optimization process may stop if:
- a time limit is reached
- no better solution can be found anymore
- progress over time becomes very small
- the user stops the method.

The cheapest road alignment found by the optimization process is then stored and returned to the user. For the same input data, the method may run multiple optimizations in parallel, that use different weights for soft costs. The method is then able to provide a selection of alternative alignments to the user.

Advantages of embodiments of the invention include the use of a discrete method to find a starting alignment. This produces good starting alignments even in very challenging terrain (mountainous). Also, embodiments of the invention may use CMA-ES, which is currently a state-of-the-art optimization method for very difficult problems without derivatives.

Hardware Environment

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
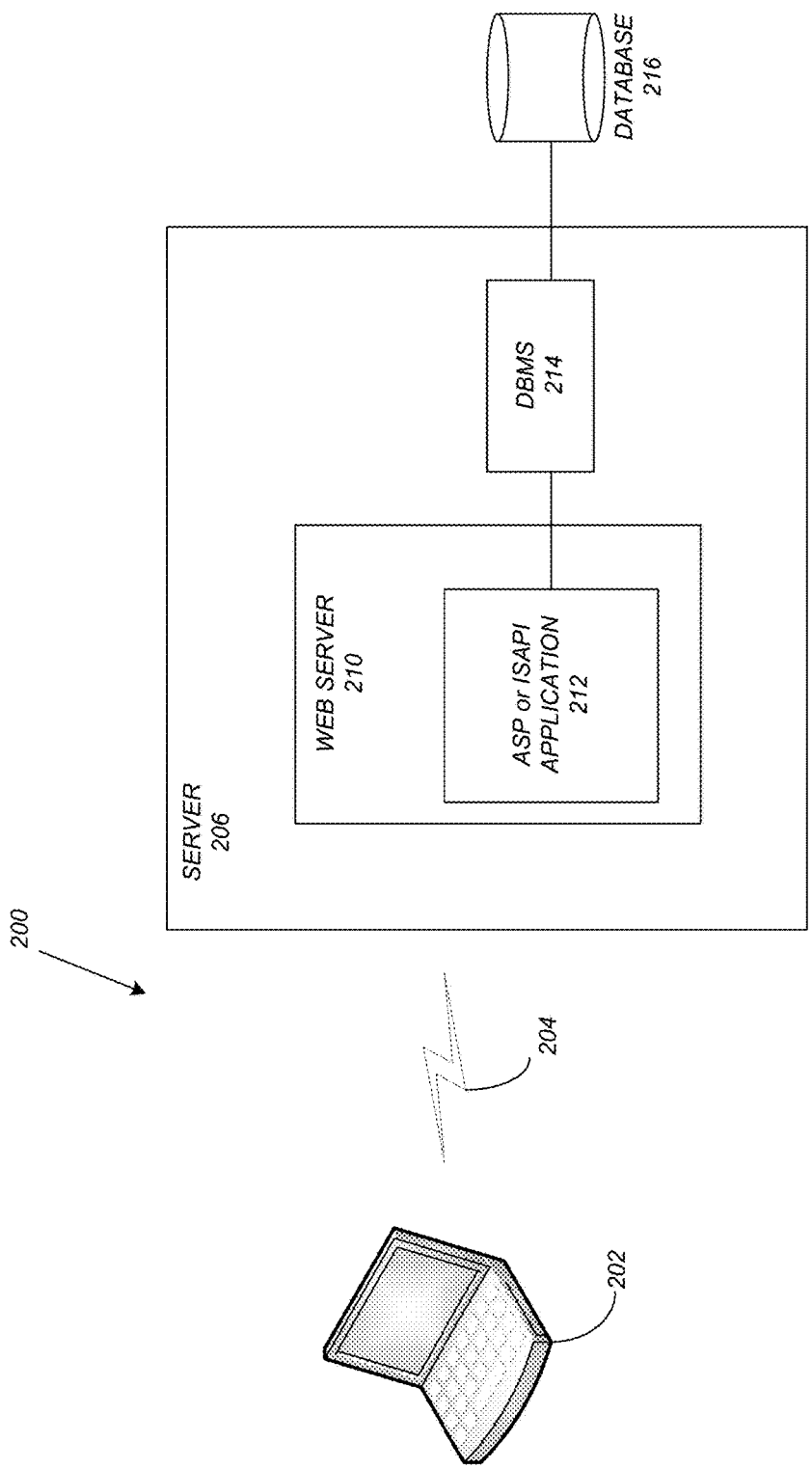
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display.

To simplify the explanations of embodiments of the invention, mathematical notation may be used when describing steps, series of steps, or acts, for performing a function or accomplishing a result. The problem may described as a mathematical model.

Model Components

The goal of embodiments of the invention is to find a "transport alignment" that minimizes various costs to build, operate, and maintain that alignment, while respecting a set of given constraints. In order to change a transport alignment, "decision variables" need to be identified first.

Decision Variables

Figure 3:
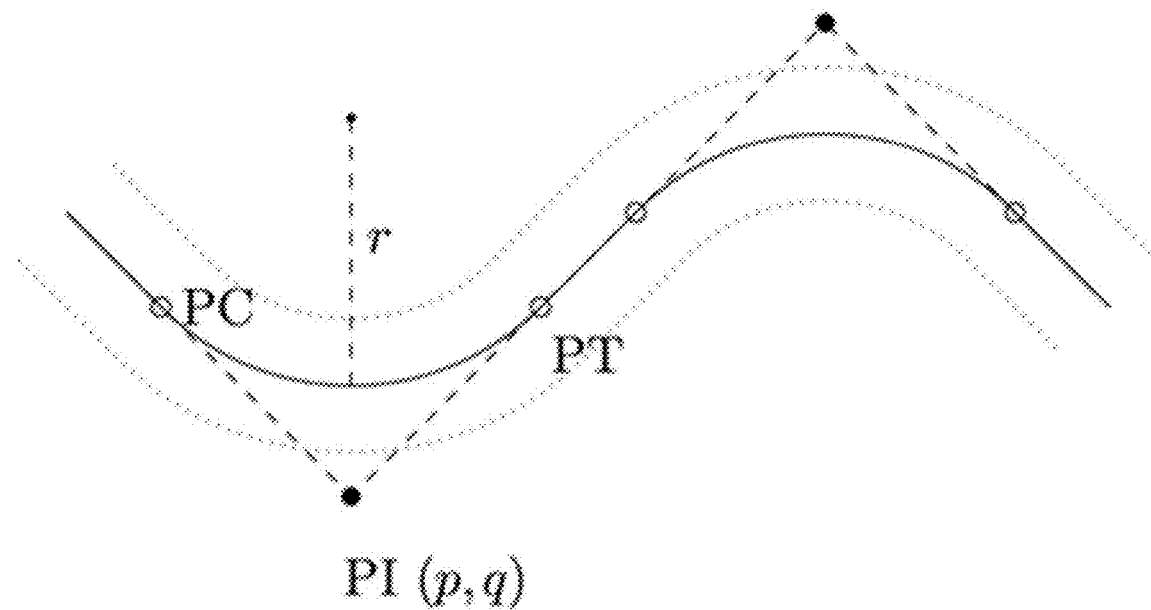
FIG. 3 illustrates an exemplary transport alignment with circular curves in accordance with one or more embodiments of the invention.

A transport alignment is a set of connected lines or a piecewise linear spline, with curves at the places where the lines connect in the plane. The point where two lines intersect in the horizontal plane is called a Point of Intersection (PI). For most transport alignments, the horizontal curves that are placed at a PI are circular arcs with a given radius. FIG. 3 illustrates an exemplary transport alignment with circular curves in accordance with one or more embodiments of the invention.

The Point of Curvature (PC) is the point where the curve starts, and the Point of Tangency (PT) is the point where the curve ends. In rare cases, the horizontal curves may also be parabolic, and are defined by a curve length instead.

Definition—Transport Alignment

A transport alignment is defined as an ordered set of triples $$\mathcal{C} = \{(p,q,r) \in \mathbb{R}^3 | r \geq 0\},$$

where each triple represents a curve with the PI longitude p, the PI latitude q, and the curve radius r for a circular arc. In the case of a parabolic curve, r represents the curve length instead. The cardinality card ($\mathcal{C}$) is the number of triples in the set.

Let n=3card ($\mathcal{C}$) be the number of decision variables in the model of embodiments of the invention. One may map the curve triples into a vector $x \in \mathbb{R}^n$, such that for i=1, 2, ..., n, $x_i = p_i$, $x_{n/3+i} = q_i$, $x_{2n/3+i} = r_i$.

Cost Functions

The cost of a transport alignment depends on various factors and can be split in different type of costs. In embodiments of the invention, the costs may be grouped into two major categories, hard costs, and soft costs.

Definition—Hard Cost

A hard cost is a cost that can be expressed as a monetary value. The total hard costs may be defined as $h(x) = \sum_{i=1}^{H} h_i(x)$, where $H \in \mathbb{N}^+$ is the number of individual hard costs.

Some common examples for individual hard costs are:
Earthwork cost for cut, fill, and haul of earth quantities.
Construction cost for pavement, drainage installation, structures, utilities.
Land cost for buying land parcels, or parts of land parcels.
Clearing cost for cutting trees and bushes.

Definition—Soft Cost

A soft cost is a cost that cannot be expressed as a monetary value. Let $S \in \mathbb{N}$ be the number of different soft cost types. Total soft costs may be defined as:

$s(x) = \sum_{i=1}^{S} \beta_i s_i(x)$, such that $s(x) \in [0, C]$, where $C \in \mathbb{R}$ is a constant, and $\beta \in \mathbb{R}_{\geq 0}$ is a weight factor.

Ideally, it is desirable that for most alignments x, that $s(x) \in [0,1]$. However, creating s(x) so that C=1 may result in very small costs s(x) for most x. Hence, C may be chosen such that for most x, $s(x) \in [0,1]$.

Possible examples for individual soft costs are:
Environmental sensitive areas.
Residential areas.
Cultural and historical zones.

Hard and soft cost functions are explained in more detail below.

Constraints

A transportation alignment is usually subject to constraints. In general, all constraints can be reduced to a set of inequalities of the form $g_i(x) \leq 0, i=1, 2, \ldots, m$, (1)

where $m \in \mathbb{N}$ is the number of constraints. In one formulation, an equality constraint of the form a(x)=0 can be represented as two inequalities $a(x) \leq 0$ and $a(x) \geq 0$. Following are some examples for typical transport alignment constraints.

Design Constraints

Standards and policies such as the ones from the American Association of State Highway and Transportation Officials [1] may require minimum curve radius, minimum distances between PIs, or other constraints that affect the geometry of the alignment. These type of constraints are referred to as design constraints. As an example, consider a curve i. If a standard requires the radius to be no smaller than a minimum $R_{min}$, the corresponding inequality in a formulation of the invention would be $R_{min} - r_i \leq 0$.

Figure 4:
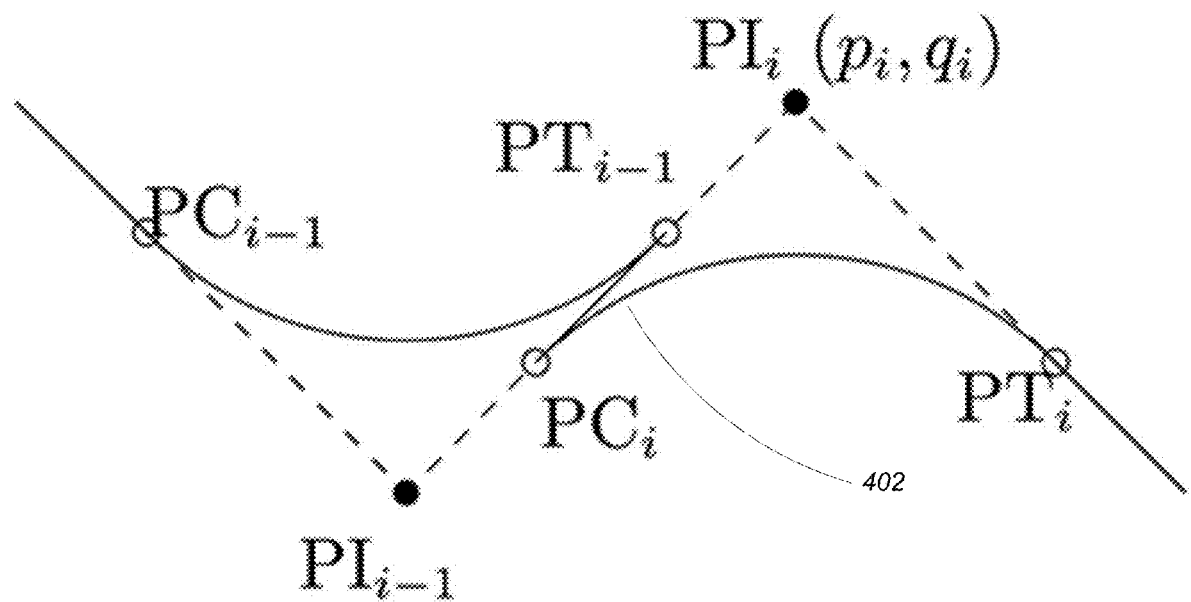
FIG. 4 illustrates a geometric constraint for positioning of a PI for a curve i with a given radius $r_i$ in accordance with one or more embodiments of the invention.

In order to avoid PI placements that result in overlapping curves as shown in FIG. 4 (i.e., at 402), one needs to make sure that adjacent PIs are placed at sufficient distances from each other. In this regard, FIG. 4 illustrates a geometric constraint for positioning of a PI for a curve i with a given radius $r_i$.

One denotes $dist(PI_i, PT_i)$ as the euclidean distance from the PI position $(p_i, q_i)$ to the PT position. A sufficient distance between the curve i and a previous curve i−1 can be formulated with the inequality $dist(PI_i, PT_i) + dist(PI_{i-1}, PT_{i-1}) - dist(PI_i, PI_{i-1}) \leq 0$.

Avoidance Zones

A planner may want to include avoidance zones. The goal is that the transport alignment does not cross any part of an avoidance zone. Let $\bar{v}(x)$ be a violation measure $\bar{v}: \mathbb{R}^n \to [0, \infty)$, where $\bar{v}(x) > 0$ when the alignment crosses the avoidance zones, and $\bar{v}(x) = 0$ otherwise. Then a corresponding inequality in a formulation of the invention would be:

$\bar{v}(x) \leq 0$.

Optimization Models

The mathematical building blocks described above can be used in many different ways. In this section, two possible mathematical models are derived that can be solved by a method of embodiments of the invention.

A general transport alignment optimization problem, involving hard costs (h(x)) only, can be stated as $$\min \quad h(x) \qquad (2)$$
$$\text{s.t.} \quad g_i(x) \leq 0, i = 1, 2, \ldots, m,$$
$$x \geq 0.$$

Depending on the method to optimize this problem, the constraints may pose a problem. There are well known techniques to convert a constraint problem into an unconstrained problem. One such technique is to incorporate the constraints into a barrier method. Another technique is to use a penalty function. The choice of technique depends on the individual constraints. Hence, the two methods could also be combined, where one of the methods is used for some of the constraints, and the other method for the other constraints. Other methods may be used to create suitable penalty values.

Barrier Method

If a constraint cannot be violated at any point in time during the optimization, a barrier method may be used. To give an example with a logarithmic barrier method, assume a subset $\mathcal{J}$ of the set $\mathcal{M}$ of all constraints, that cannot be violated. Equation (2) may be reformulated as:

$$\min \quad h(x) - \sum_{j \in \mathcal{J}} \log(\min(-g_j(x), 1)) \qquad (3)$$
$$\text{s.t.} \quad g_i(x) \leq 0, \qquad i \in \mathcal{M} \setminus \mathcal{J}$$
$$x \geq 0.$$

Penalty Method

If a constraint may be violated during the optimization, but should be satisfied in a final solution, a penalty method may be used. To give an example of a penalty method, assume a subset $\mathcal{U}$ of the set $\mathcal{M}$ of all constraints, that may be violated during the optimization. Equation (2) can be reformulated as:

$$\min \quad h(x) + \sigma_k \sum_{u \in \mathcal{U}} \max(0, g_j(x))^2 \qquad (4)$$
$$\text{s.t.} \quad g_i(x) \leq 0, \qquad i \in \mathcal{M} \setminus \mathcal{J}$$
$$x \geq 0,$$

where $\sigma_k$ is a penalty coefficient that depends on the number of iterations k of the optimization method. This coefficient increases with k (e.g. by a factor of 10).

Hard Cost Minimization

The barrier and the penalty method terms can be combined. For further simplification, one may denote:

$$p(x) = -\sum_{j \in \mathcal{J}} \log(\min(-g_j(x), 1)) + \sigma_k \sum_{u \in \mathcal{U}} \max(0, g_j(x))^2.$$

as the combined barrier-penalty term (p(x)), and the optimization problem may be reformulated as the unconstrained hard cost minimization problem:

$$\min \quad h(x) + p(x) \qquad (5)$$
$$\text{s.t.} \quad x \geq 0.$$

Weighted Hard and Soft Cost Minimization

In the previous model, soft costs were not included. Since soft costs are not measurable in monetary values, they cannot be compared directly with hard costs. A suitable scaling factor needs to be found. For a planner, a tangible measure to factor in soft costs are the hard costs. Since for all x, $s(x) \in [0,C]$, and for most x, $s(x) \in [0,1]$, one can formulate the weighted hard and soft cost minimization as $$\min \quad h(x) + \lambda h(x)s(x) + p(x) \qquad (6)$$
$$\text{s.t.} \quad x \geq 0,$$

where $\lambda$ is a weight factor in $[0, \infty]$, with meaningful values such as:

$\lambda = 0$, that considers hard costs only (equivalent to (5)),
$\lambda = \frac{1}{2}$, that weighs soft costs as half important than hard costs,
$\lambda = 1$, that weighs soft costs with an equal importance than hard costs,
$\lambda = 2$, that weighs soft costs twice as important than hard costs, etc. The above model may be solved in parallel for different $\lambda$ values. This provides the user with a set of different alternatives that are Pareto optimal w.r.t. the weight parameter $\lambda$[18].

Constrained Soft Cost Minimization

Instead of using weights, the following 2-step model may be more appropriate for certain decision makers. In the first step, hard costs are minimized:

$$z^* = \min \quad h(x) + p(x) \qquad (7)$$
$$\text{s.t.} \quad x \geq 0,$$

where $z^*$ is the optimal solution to (7). The constrained soft cost minimization may be formulated as:

$$\min \quad \alpha s(x) + p(x) \qquad (8)$$
$$\text{s.t.} \quad h(x) \leq \beta z^*,$$
$$x \geq 0,$$

where $\alpha > 1$ and $\beta > 1$ are scaling factors. The factor $\beta$ indicates by how much the optimal hard cost solution $z^*$ can be exceeded, in order to minimize the soft costs. A value of $\beta = 1$ is equivalent to (7). If one uses again a penalty function of the form:

$$q(x) = \sigma_k \max(0, h(x) - \beta z^*)^2,$$

equation (8) can be reformulated as the unconstrained equivalent:

$$\min \quad \alpha s(x) + p(x) + q(x) \qquad (9)$$
$$\text{s.t.} \quad x \geq 0.$$

Method Overview

With the model descriptions described above, an overview of the method can be described. Let the function f(x)

represent any of the objective functions (5), (6), or (9). A method of embodiments of the invention is iterative. In each iteration, several different transport alignments may be evaluated. Hence, a vector of multiple alignments may be created:

$$\bar{x} = (x^1, x^2, \ldots, x^l),$$

where $l \in \mathbb{N}$. The function that evaluates all of these roads may be written, and returns the cost of the best alignment as $$\bar{f}(\bar{x}) = \min_{x \in \{x^1, \ldots, x^l\}} f(x),$$

and the best alignment would then be written as $$x^*_k = \arg\min_{x \in \{x^1, \ldots, x^l\}} f(x).$$

Further, let $$c: \mathbb{R}^{l \times n} \to \mathbb{R}^{l \times n}$$

be a stochastic optimization method that changes the vectors inside the vector $\bar{x}$ using some directional information provided by the objective function $\bar{f}(\bar{x})$. Embodiments of the invention may work best when using the Covariance Matrix Adaptation Evolution Strategy (CMA-ES) as the method for $c(\bar{x})$, but any variation of CMA-ES or any other Evolutionary Strategy may be utilized as well.

Figure 5:
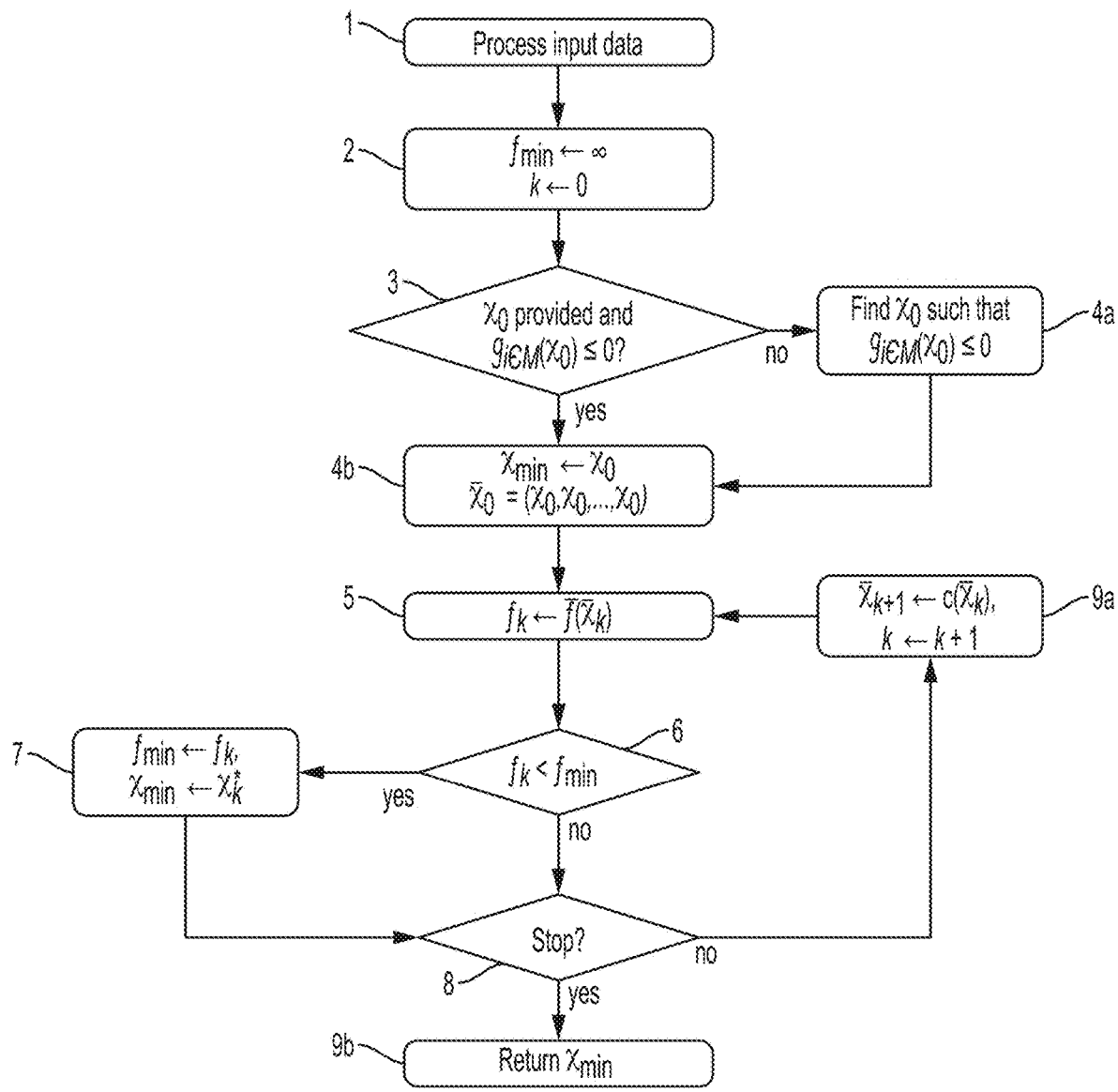
FIG. 5 illustrates a simplified method overview in schematic form—i.e., a flow chart of the steps used to find an optimal alignment in accordance with one or more embodiments of the invention.

FIG. 5 illustrates a simplified method overview in schematic form—i.e., a flow chart of the steps used to find an optimal alignment in accordance with one or more embodiments of the invention. In step (1), the method imports all the data that is needed. This includes parameters for design constraints as explained above, as well as vector and raster data that is used in the different cost functions. A more detailed explanations about input data is described below.

In step (2), the method initializes and stores the best cost value $f_{min}$, as well as an iteration counter k in memory. $f_{min}$ is initialized to infinity (the highest possible cost), and k to zero. If a starting alignment $x_0$ is provided by the user, and that starting alignment is feasible for all the constraints (i.e.

g(x)≤0), then the method proceeds to step (4b). Otherwise, the method tries to find a starting alignment in step (4a). This step is explained in more detail below. In step (4b), the method stores the initial alignment in memory as the current best alignment $x_{min}$ and proceeds to step (5). Step (5) is the execution of the cost evaluation $\bar{f}(\bar{x}_k)$, where $\bar{x}_k$ are the 1 different alignments in iteration k. The current cost value $f_k$ is then compared with the stored best value $f_{min}$. If $f_k$ is a lower cost than $f_{min}$, the method replaces $f_{min}$ with this lower cost and also store the current alignment that produces this lower cost as corresponding best alignment $x_{min}$. The method then checks for a stopping condition in step (8). A typical stopping condition can be that a given solving time expired,
a given number of iterations is exceeded,
the improvement of the best value is smaller than a tolerance,
or the change of the alignment x by the stochastic optimization method is very small (smaller than a tolerance).

Other stopping conditions may be defined. If none of the stopping conditions is met, the method proceeds to step (9a) and modifies the current alignments $\bar{x}_k$ using a stochastic optimization method c(x), in order to produce a new alignment $x_{k+1}$. The iteration counter k is then incremented. Once the method reaches a stopping condition, the best solution $x_{min}$ is returned.

If f(x) uses the objective function in (6), a value for λ needs to be chosen. In order to produce multiple alternatives, one can run the method with different λ values simultaneously on multiple computers or a single computer with multiple processors or processor cores.

Input Data Storage

The input to the method may include, but is not limited to, terrain data, starting and end point for the path or a starting alignment for the path, design constraints, geographical information data such as roads, railways, buildings, user preferences and ranking (weights). The method also requires cost input that may include earthwork costs, construction costs, land costs, environmental costs, etc. Large data can be provided either in vector format, or in raster format. The import and storage of some types of input data follow.

Terrain

Terrain data is a required input. The method can read in terrain data in raster file format. Common raster file formats for terrain data include GeoTIFF or DEM. The method is not limited to these formats.

Figure 6:
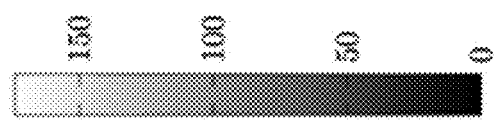
FIG. 6 illustrates ground surface layer data stored as matrix of elevation values in accordance with one or more embodiments of the invention.
Figure 6:
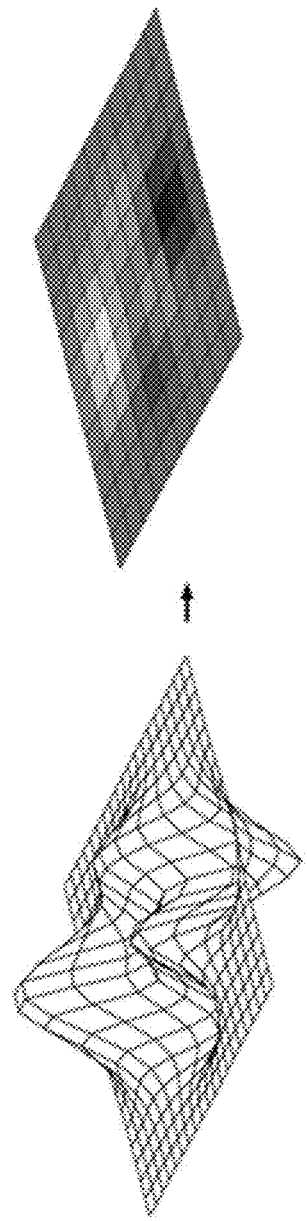

The elevation values in the raster file in memory may be stored as a matrix of elevation values (e.g., see FIG. 6). In this regard, FIG. 6 illustrates ground surface layer data stored as matrix of elevation values. If the raster data is not rectangular, some special values such as ∞ need to be stored in the matrix position that are not covered by the raster data. Let $\mathbb{N}^+$ be the set of positive integers. Then the matrix of the terrain data consists of $h \in \mathbb{N}^+$ rows, and $w \in \mathbb{N}^+$ columns.

The terrain data is used to compute the hard costs for earthwork and construction costs as explained further down. It may also be used for other cost computations or constraints.

Water

Figure 7:
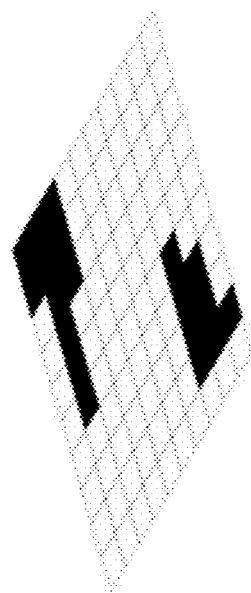
FIG. 7 illustrates water zone layer data stored as matrix of flags that indicate wetlands in accordance with one or more embodiments of the invention.
Figure 7:
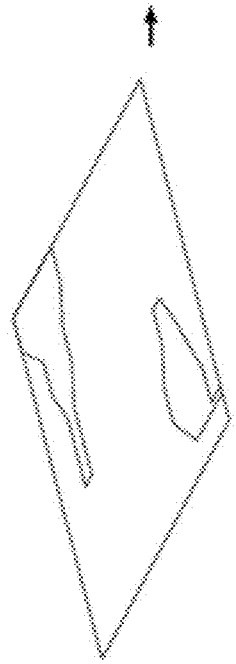

Water data is an optional input to a method of the invention. The method can read in water data as vector or raster file format. The water zones are converted into a h×w matrix of 0 and 1 values, where 1 indicates wetland, and 0 indicates normal terrain. The matrix is then stored into memory (FIG. 7). In this regard, FIG. 7 illustrates water zone layer data stored as matrix of flags that indicate wetlands.

The water data is used to compute the hard costs for earthwork and construction costs as explained further down. It may also be used for other cost computations or constraints, such as environmental impact, etc.

Avoidance Zones

Avoidance zone data is an optional input to a method of the invention. The method can read in avoidance zone data as vector or as raster file format. The avoidance zones are converted into a h×w matrix of 0 and non-zero values, where a non-zero value indicates an avoidance zone, and 0 indicates normal terrain. Avoidance zones are handled very similar to water zones.

Land Use

Figure 8:
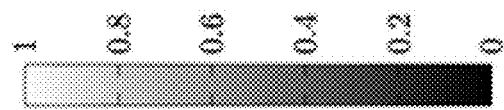
FIG. 8 shows a land use matrix (i.e., a land usage layer stored as a matrix of land cost values) in accordance with one or more embodiments of the invention.
Figure 8:
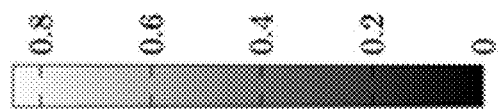
Figure 8:
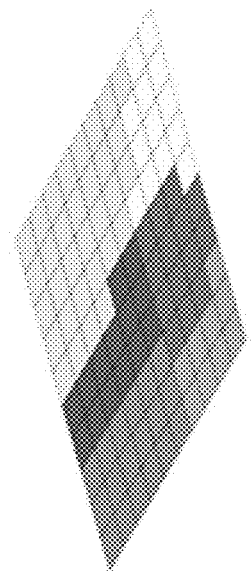

Land use data is an optional input to a method of the invention. The method can read in land use data as vector or raster file format. The land parcels are converted into a h×w matrix of monetary cost values. One can distinguish between two different types of land use costs: discrete and continuous. In a discrete land use layer, the cost value would be for the full parcel, and the full parcel needs to be bought if traversed. In a continuous land use layer, the cost value would be per square unit. FIG. 8 shows a land use matrix (i.e., a land usage layer stored as a matrix of land cost values).

Soft Cost Map

Figure 9:
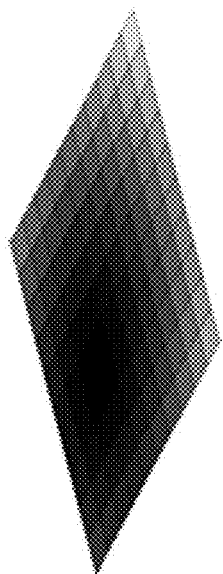
FIG. 9 illustrates a soft cost map stored as matrix of cost values in [0,1] in accordance with one or more embodiments of the invention.

A soft cost map is an optional input to a method of the invention. The method can read a soft cost map in raster format. FIG. 9 illustrates a soft cost map stored as matrix of cost values in [0,1] in accordance with one or more embodiments of the invention. Soft cost maps can be created using simple functions that model costs such as environmentally sensitive areas (for example noise pollution via inverse square law). Soft cost maps can also created from existing GIS (Geographic Information Systems) data, using methods such as the Analytical Hierarchical Process (AHP) [21]. Again, the soft cost map is stored in memory as an h×w matrix with the same orientation as the terrain (e.g., see FIG. 9).

Surface Projection

Figure 10:
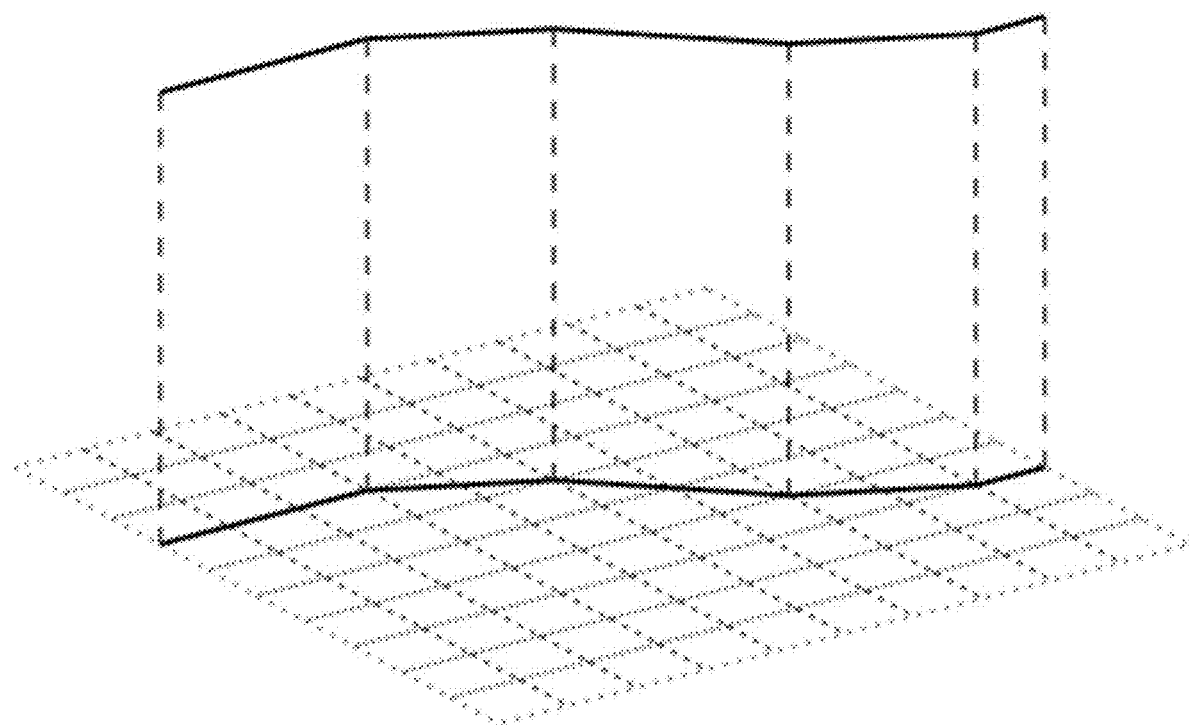
FIG. 10 illustrates a projection of a transport alignment centerline on to a surface grid in accordance with one or more embodiments of the invention.

A key element to the cost computations in methods of the invention is the projection of the transport alignment onto the different data matrices described above (e.g., see FIG. 10). In this regard, The projection allows the relevant data to be read from the surface layers. Since all the surface layers have the same h×w dimension, one needs to project only to one such surface, and the resulting coordinates can be re-used to read the other data layers at the same time.

Following a description of the surface projection. Consider a matrix $A \in \mathbb{R}^{h \times w}$. The matrix is examined as a grid with w vertical grid lines, and h horizontal grid lines. To obtain a value at any position $(\hat{x},\hat{y}) \in \mathbb{R}^2$ from the grid, a bilinear interpolation method v: $(\hat{x},\hat{y}) \to \mathbb{R}$ may be employed, where $$s=\lfloor \hat{x} \rfloor, a=\hat{x}-s,$$

$$t=\lfloor \hat{y} \rfloor, b=\hat{y}-t,$$

$$v(\hat{x},\hat{y})=(1-a)(1-b)A(s,t)+a(1-b)A(s+1,t)+(1-a)bA(s,t+1)+abA(s+1,t+1) \qquad (10)$$

where s, t, a, b $\in \mathbb{R}$, and $\lfloor \cdot \rfloor$ is the floor function.

In a surface projection, one considers each curve $c_i \in \mathcal{C}$, i=1,2,..., card ($\mathcal{C}$) in sequential order. For each curve, the PC and the PT are computed.

As an example, let $\theta \in \mathbb{R}$ be the deflection angle in radians between the line segments from the PIs of $c_{i-1}$ and $c_i$, and $c_i$ and $c_{i+1}$. One can easily compute the PC $(\bar{p}_i, \bar{q}_i)$ for $c_i$ with $$(\bar{p}_i, \bar{q}_i) = (p_i, q_i) + t \frac{(p_{i-1}, q_{i-1}) - (p_i, q_i)}{\|(p_i, q_i) - (p_{i-1}, q_{i-1})\|_2},$$

where $t = r \tan(\theta/2)$. Similarly, one can compute the PT.

Figure 11:
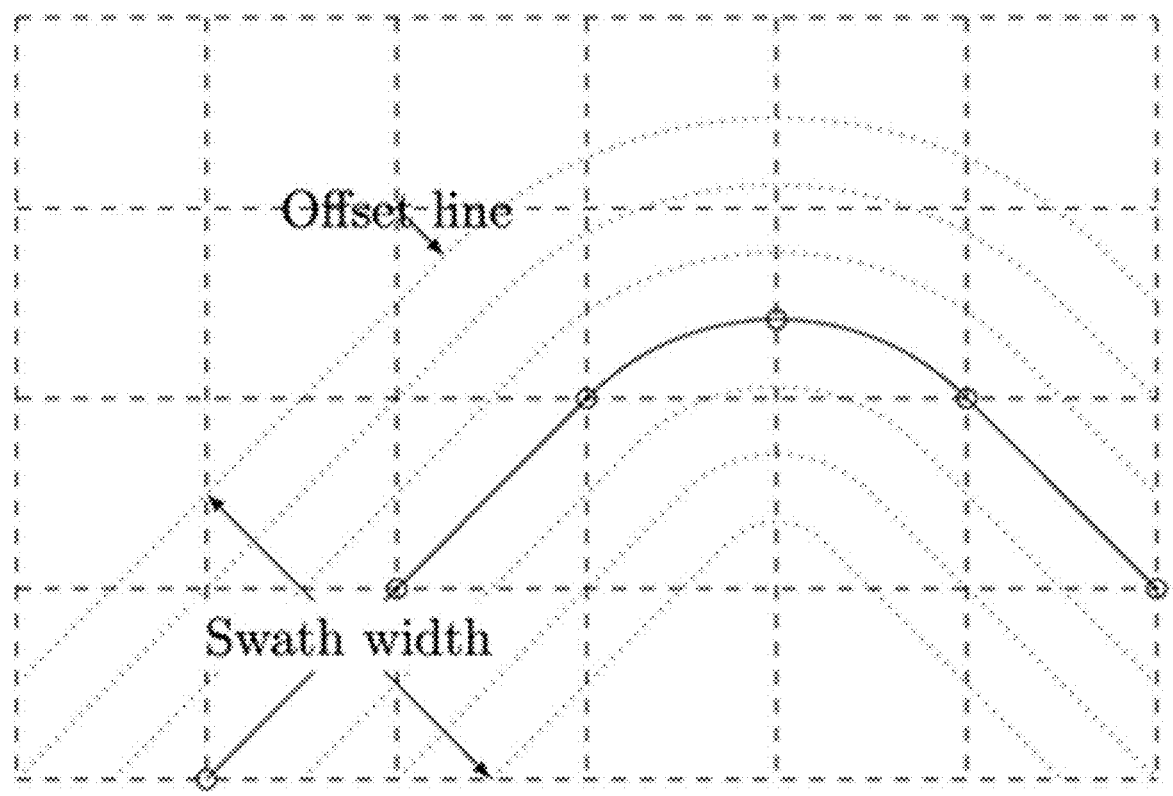
FIG. 11 illustrates the projection of a transport alignment centerline, and offset lines, onto a grid in accordance with one or more embodiments of the invention.

One starts at the PT of curve $c_{i-1}$. If i=1 and $r_i$=0, then one just starts with the PI of curve $c_i$ instead. Moving along the line $\overline{PT_i PC_{i+1}}$, the points where the line intersects the grid are computed (e.g., see FIG. 11) and use the function (10) to obtain the grid values. In this regard, FIG. 11 illustrates the projection of a transport alignment centerline, and offset lines, onto a grid.

Once $PC_{i+1}$ is reached, points are sampled at a regular distance along the arc until reaching $PT_{i+1}$. At each point, a value is obtained using equation (10). The process then shifts to the next curve $c_{i+1}$, and the procedure is repeated.

Depending on the cost function, the values along the centerline may not be sufficient. For example, for earthwork cost computations, one may want to know what the terrain to the left or right of the centerline looks like. Similarly, for construction costs, one wants to know if there is water within the road width to the left or right of the centerline. For this reason, values for offset lines may also be obtained, which are at chosen distances to the left and right of the centerline (e.g., see FIG. 11). The procedure to obtain the grid values for the offset lines is the same as for the centerline.

Figure 12:
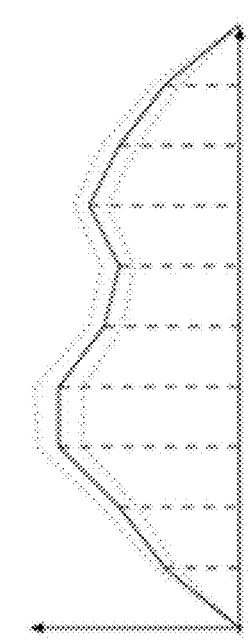
FIG. 12 shows an example of a centerline profile and two offset profiles for the terrain elevations of a given alignment in accordance with one or more embodiments of the invention.
Figure 12:
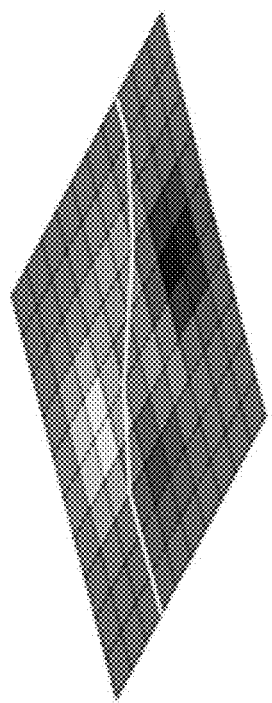
Figure 13:
FIG. 13 shows an example of a centerline profile and two offset profiles for water in accordance with one or more embodiments of the invention.
Figure 13:
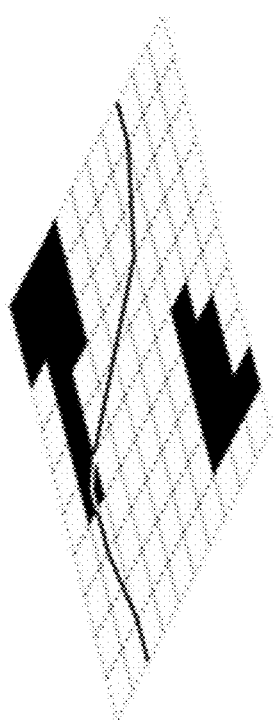
Figure 14:
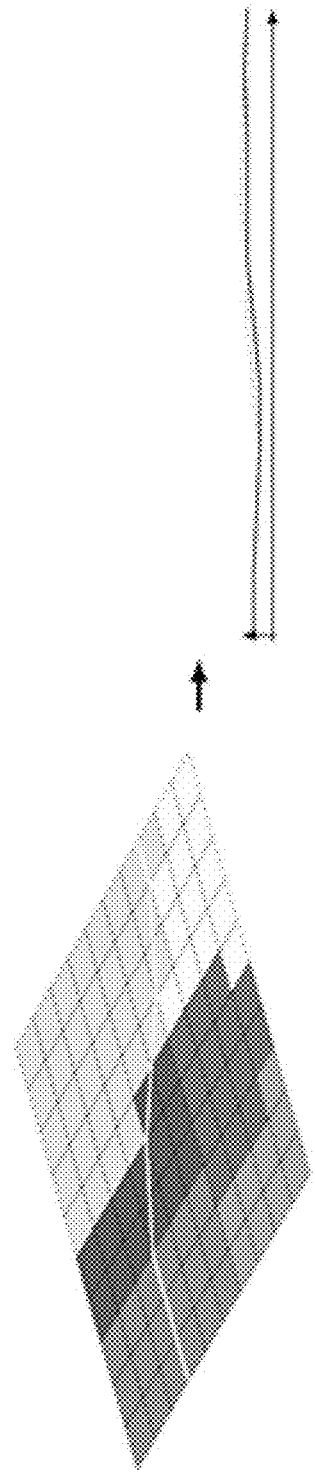
FIGS. 14 and 15 show the profiles for land use and soft costs respectively in accordance with one or more embodiments of the invention.
Figure 15:
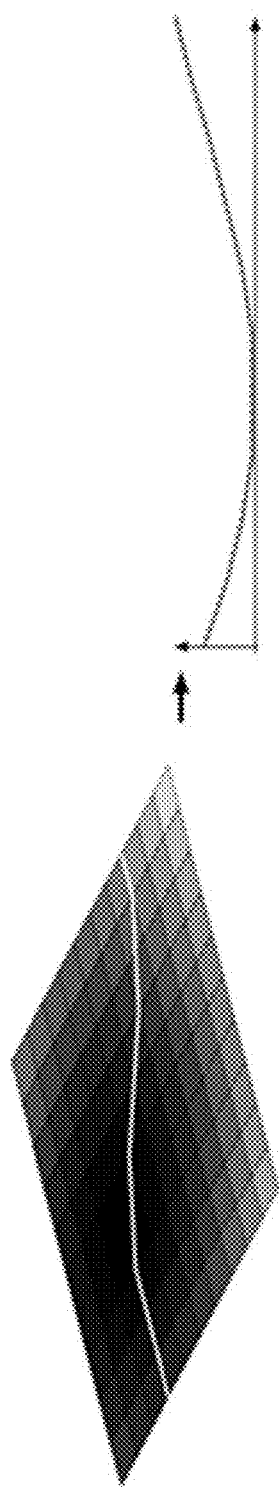

The sequential grid values are stored as profiles, where the grid value is the y-value in the profile, and the x-value is the station value representing the distance along the alignment (the beginning of the alignment has a station value of zero). FIG. 12 shows an example of a centerline profile and two offset profiles for the terrain elevations of a given alignment. FIG. 13 shows an example of a centerline profile and two offset profiles for water. The profile y-values are 0 for dry land, and 1 if the line crosses wetland. FIGS. 14 and 15 show the profiles for land use and soft costs respectively.

Cost Functions

The concepts of soft and hard costs, and how they are used in different models are described above. Thereafter, how profile data is obtained for a given transport alignment was described. Below is a description of some of the cost functions that use this profile data in greater detail.

Earthwork Costs

Earthwork costs can be computed by employing various methods or parts of methods including the method, or parts of the method, described in the patent application for Road Design Optimization [17], and the method, or parts of the method, described in the paper and patent application for Projection Methods for Solving Feasibility and Best Approximation Problems with Halfspaces [2, 3].

As explained above, one can obtain a ground profile for the centerline along the transport alignment, as well as offset ground profiles to the left and right of the centerline. The profiles can then be used as input into methods to compute earthwork costs (e.g., the method described in [17]). To make computations faster, one does not need to use the full method in [17]. Instead, with the given centerline profile, one can call the method described in [3] to find a feasible transport alignment profile. Since the method in [3] produces already good profiles w.r.t. earthwork cost, one can just utilize various portions [17], without solving for the positions of the Points of Vertical Intersection (PVI). The PVI positions would just be fixed with the values obtained from method [3]. The resulting transport profile may not be an exact optimal solution, but it is good enough for a useful evaluation of the corresponding horizontal alignment described herein.

Construction Costs

In various methods (e.g., the method in [17]), construction costs may be accounted for by simply computing a construction cost per linear unit, and multiplying this cost by the length of the alignment (centerline profile length). Such an approach does not take construction of tunnels and bridges into account. Thus, embodiments of the invention may utilize a new construction cost method, that is based on sample lines. Sample lines are lines that are perpendicular to the alignment centerline. The length of such a sample line is called the swath width (see FIG. FIG. 11). Sample lines are usually placed at the beginning of each sub-section, as described in [17].

For each sub-section, the cross-section that results from the sample line at the beginning of that section is examined. Depending on the type of transport alignment, and other factors, construction rules that are based on the information obtained from the cross section may be applied. As an example, consider a transport alignment similar to a road or a highway. The following rule may be introduced.

EXAMPLE

At a given sample line, let $h_t$ be the elevation of the transport alignment, and $h_g$ the elevation of the ground at the centerline of the alignment. If $h_t > h_g$, and $h_t - h_g > H_f$, where $H_f$ is a maximum fill height, then a bridge is used in the subsection following the sample line, instead of an earthwork fill. Similarly, if $h_t < h_g$, and $h_g - h_t > H_c$, where $H_c$ is a minimum cut depth, then a tunnel is used in the subsection following the sample line, instead of an earthwork cut.

In this example, one can also replace the use in the sub section that follows the sample line with a use in half of the sub section that proceeds the sample line, and half of the sub section that follows the sample line. The construction costs are computed at every sample line, using a selected assembly or style (assemblies are also called road components and are used to denote the set of construction building blocks for a road), and a sample line distance l for the length of a construction subsection. The total construction cost is the sum of the individual subsection costs.

Described below are a few additional examples of how construction costs can be computed for different transport alignment assemblies.

Road Assembly Example

Figure 16:
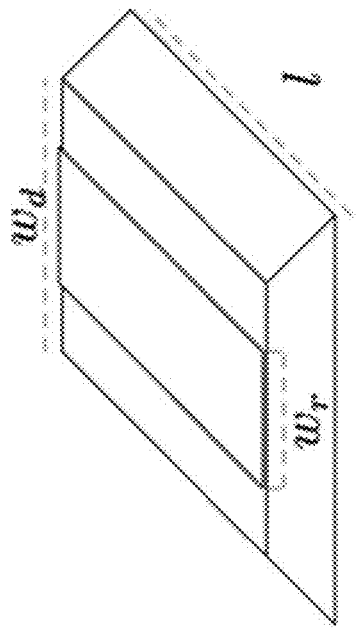
FIG. 16 illustrates a road assembly over a sub section length (or sample line distance) l in accordance with one or more embodiments of the invention.

The construction cost for a sample line subsection with a road assembly is l times the road cost per linear unit. FIG. 16 illustrates a road assembly over a sub section length (or sample line distance) l in accordance with one or more embodiments of the invention. The road cost per linear unit is $w_r \cdot (0.3 \cdot C + 0.7 \cdot A) + D + S + L + G$, where C is the cement pavement cost per square unit, A is the asphalt pavement cost per square unit, D is the cost for drainage, S for signing, L for lighting, and G for signaling per linear unit. The road width is the number of road lanes multiplied by the width of a road lane. It does not include the width of medians, sidewalks, etc.

Bridge Assembly Example

Figure 17:
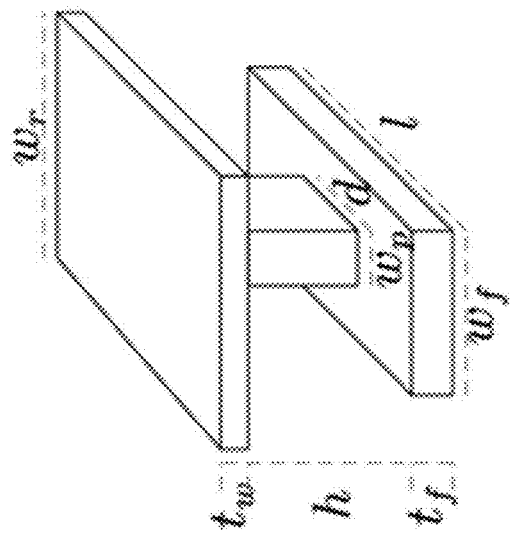
FIG. 17 illustrates a bridge assembly over a sub section length (or sample line distance) l in accordance with one or more embodiments of the invention.

The construction cost for a sample line subsection with a bridge assembly is the sum of the road cost, the beam cost, and the pylon cost, if a pylon is placed in that section. The road cost is l times the road cost per linear unit. FIG. 17 illustrates a bridge assembly over a sub section length (or sample line distance) l in accordance with one or more embodiments of the invention. The beam cost is the volume $V_b=l \cdot w_r \cdot t_w$ times the beam cost per cubic unit. The pylon cost is the volume $V_p=l \cdot w_f \cdot t_f + d \cdot w_p \cdot h$ times the pylon cost per cubic unit. The road cost per linear unit on a bridge is $w_r \cdot C+D+S+L+G$, where C is the cement pavement cost per square unit, D is the cost for drainage, S for signing, L for lighting, and G for signaling per linear unit.

Tunnel Assembly Example

Figure 18:
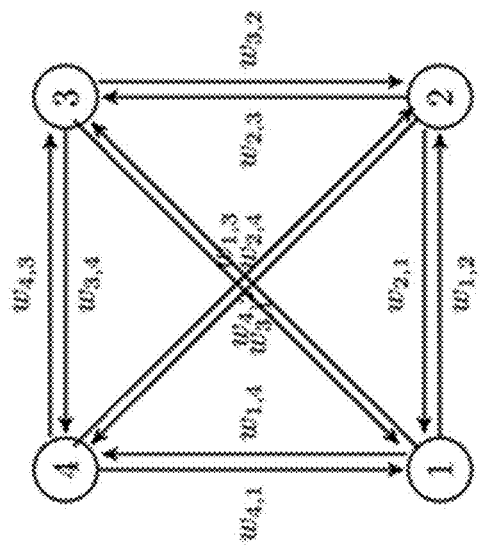
FIG. 18 illustrates a tunnel assembly over a sub section length (or sample line distance) l in accordance with one or more embodiments of the invention.
Figure 18:
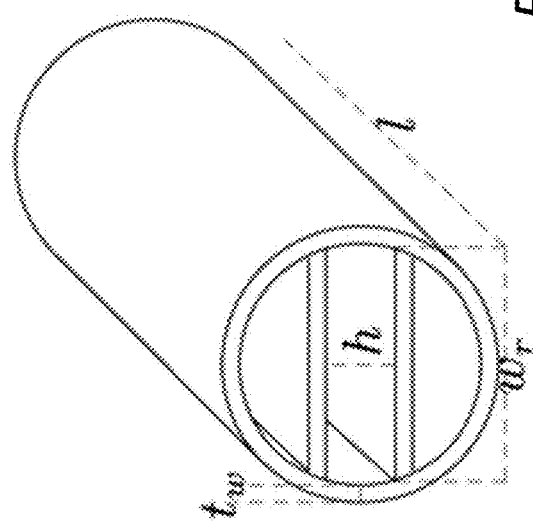

The construction cost for a sample line subsection with a tunnel assembly is the sum of the road cost, the drilling cost, and the wall cost. The road cost is l times the road cost per linear unit. FIG. 18 illustrates a tunnel assembly over a sub section length (or sample line distance) l in accordance with one or more embodiments of the invention. Let r be the tunnel radius. The drilling cost is the volume $V_d=r^2\pi \cdot l$ times the drilling cost per cubic unit. The wall cost is the volume $V_w=V_d-(r-t_w)^2\pi \cdot l$ times the wall cost per cubic unit. The road cost per linear unit in a tunnel is $w_r \cdot C+D+S+L+G$, where C is the cement pavement cost per square unit, D is the cost for drainage, S for signing, L for lighting, and G for signaling per linear unit.

Initial Alignment Finder

Finding an initial alignment between a starting and an end point is an optimization problem on its own. Since the project boundaries may encompass a very large surface area, it can be impossible to enumerate all possible paths (enumerating all possible paths would actually provide a solution for the initial problem). Hence, embodiments of the invention only try to find an approximately good path. One way to cover such a large search space is to discretize the search space. For this, a graph is placed on the surface (e.g., using a method such as that described in [22]). For example, a grid graph (or lattice graph) is constructed with a set of vertices (or nodes) that map to the coordinates of the matrix entries of the surface graph. However, a vertex may not be mapped to each surface grid point. Rather, the graph vertices are placed further apart, so that they map to surface grid points at fixed distances. This way, the vertices of the graph are placed at a lower resolution than the original surface grid. The vertices are then connected with horizontal, vertical, and diagonal edges.

Figure 19:
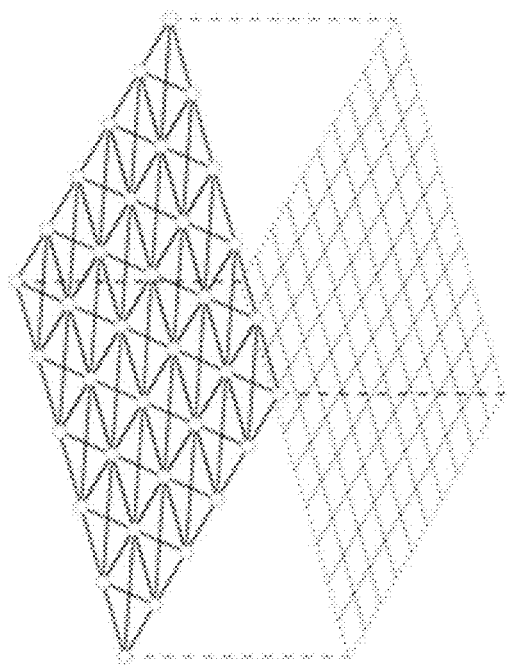
FIG. 19 illustrates a grid graph on top of a surface grid (left side), and four nodes, with edges to adjacent nodes and corresponding weights (right side) in accordance with one or more embodiments of the invention.

An example of a final graph is shown in FIG. 19. In this regard, FIG. 19 illustrates a grid graph on top of a surface grid (left side), and four nodes, with edges to adjacent nodes and corresponding weights (right side) in accordance with one or more embodiments of the invention.

Different graphs can be employed as well, like the honeycomb graph explained in [22]. For each edge that goes from a vertex i to another vertex j, a weight $w_{i,j}$ may be computed. This weight is nothing else than an objective function call f (x) as described above, where x is a straight line alignment between point i and j. Once the weights for all edges are calculated, a shortest path algorithm may be executed (e.g., Dijkstra [7]). The result is a sequential list of vertices, that represents the path with the lowest cost for moving from the start to the end point. This list is also called a shortest path tree or cheapest discrete path.

Figure 20:
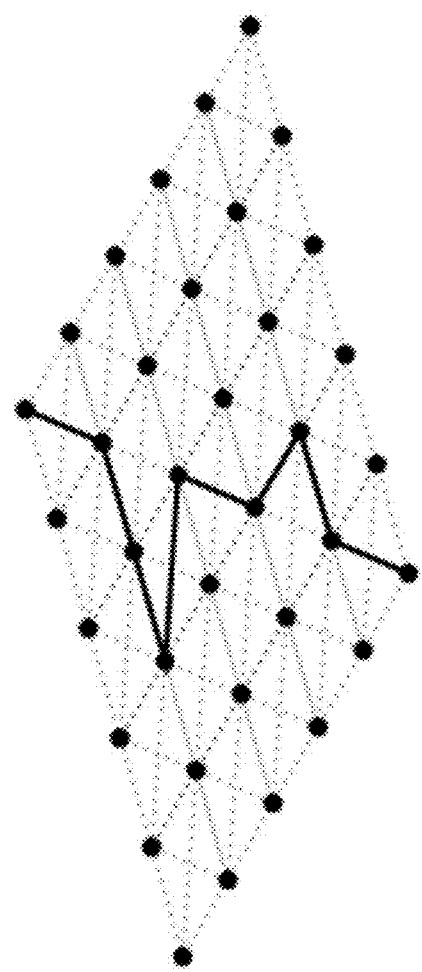
FIG. 20 illustrates a thick black line that represents an example of a potential shortest path tree on the grid graph in accordance with one or more embodiments of the invention.

The resulting shortest path tree may not be usable as a valid transport alignment. Direction changes in the solution happen in direction of the graph edges, and are quite abrupt with no curvature. An example of a shortest path tree is shown in FIG. 20. In this regard, FIG. 20 illustrates a thick black line that represents an example of a potential shortest path tree on the grid graph in accordance with one or more embodiments of the invention.

In order to transform a shortest path tree into a usable alignment, the shortest path tree is smoothed using a suitable smoothing method. Multiple different smoothing methods may be used to produce multiple solutions. The best of these solutions is then selected as the starting alignment.

Figure 21:
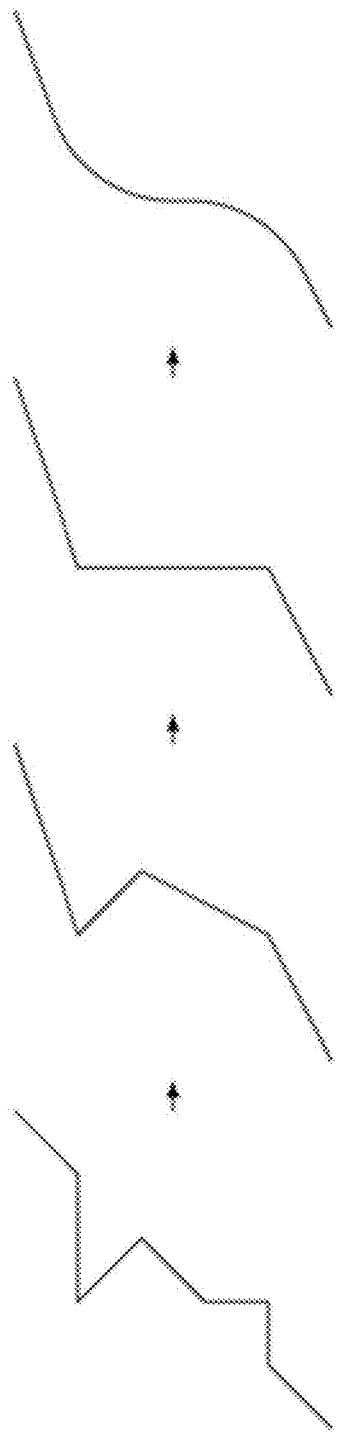
FIG. 21 illustrates an example of a potential smoothing of a shortest path tree with line reduction and fitting of curves in accordance with one or more embodiments of the invention.

Two of the potential different smoothing methods are described below. Both methods start by approximating the shortest path tree with a set of fewer lines. An attempt is then made to fit curves to the points where the lines intersect. Either the curves are fit so that the points of line intersections are acting as PIs, or, if the angle of intersection is too narrow, an attempt is made to fit a curve directly through the intersection. In some cases it is not possible to do either of the two, and the shortest path tree is approximated again with lines, but this time, with even less lines than before. This process is repeated until curves can be fit with a minimum radius to all intersections between the start and end point. If there is no intersection, then there is just a straight line between the start and end points, which is a valid alignment. In order to approximate the shortest path tree with lines as explained before, one method may utilize a Segmented Least Squares process as explained in [17, 4] in the first method, or the Douglas-Peucker line reduction process [17, 8] in the second method. An illustration of such a smoothing process is shown in FIG. 21. In this regard, FIG. 21 illustrates an example of a potential smoothing of a shortest path tree with line reduction and fitting of curves in accordance with one or more embodiments of the invention.

After the smoothing, a distance may exist between the smoothed cheapest discrete path and the first cheapest discrete path. Such a distance may be minimized using an optimization method. As used herein, the distance may be any measure of similarity between the two path, which can include such distances as the Fréchet distance, the discrete Fréchet distance, the Hausdorff distance, and any variant of such distance measures. In other words, as a result of the smoothing process, one or more curves that satisfy the minimum radius constraint are created. The line intersections of the tangents of the smoothed path act as PIs of the curve. Hence, the curve or the road (i.e., the smoothed cheapest discrete path) may not follow the first cheapest discrete path closely (i.e., there is still a difference between the smoothed cheapest discrete path and the first cheapest discrete path [unless the path is in a straight line]). In order to fit the smoothed cheapest discrete path closer to the cheapest discrete path, an optimization methodology may be used (e.g., a CMA-ES process).

When using an optimization methodology to fit the smoothed cheapest discrete path closer to the cheapest discrete path, the optimization methodology may use any subset or combination of cost functions, to change the PIs of the smoothed cheapest discrete path. The cost function may include the distance measure, and any penalty cost that may occur due to the violation of design constraints or other cost factors. The optimization methodology may stop after a given time, or after a certain number of evaluations of the cost function.

When measuring the distance between the smoothed cheapest discrete path and the cheapest discrete path, each path may be divided up into the same constant number of points. Then the maximum over all distances between one point on the smoothed cheapest discrete path, and another point on the cheapest discrete path that has the same relative position on the smoothed cheapest discrete path than the point on the cheapest discrete path is obtained.

Logical Flow

Figure 22:
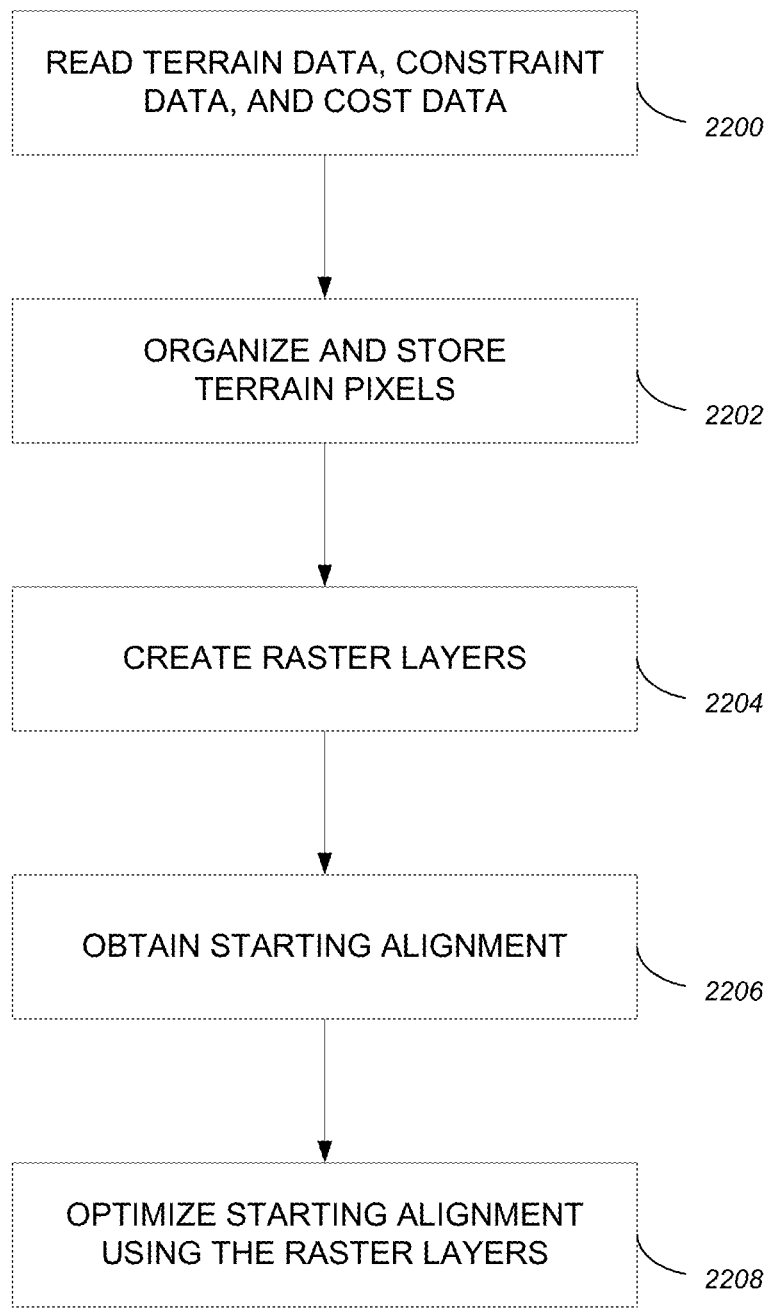
FIG. 22 is a flow chart illustrating the logical flow for optimizing transport alignments in accordance with one or more embodiments of the invention.

FIG. 22 is a flow chart illustrating the logical flow for optimizing transport alignments in accordance with one or more embodiments of the invention.

At step 2200, terrain data, constraint data, and cost data are read.

At step 2202, terrain pixels (having elevation values) are organized and stored. The terrain pixels are organized in a first grid structure having rows and columns to/that enable efficient access to each terrain pixel.

At step 2204, one or more raster layers of a same dimension and orientation as the first grid structure are created. Such raster layers may include a water data layer and/or an avoidance zone layer. Further, one of the layers may be hard costs that are quantifiable in monetary values, and another layer may consist of soft costs (that are not quantifiable in monetary values).

At step 2206, a starting alignment is obtained. A starting alignment may simply be input. Alternatively, start and end points may be input instead of the starting alignment. To obtain the starting alignment from start and end points, a second grid structure may be used. The second grid structure is coarser than the first grid structure, and edges of the second grid structure connect grid points horizontally, vertically, and diagonally. Further, the second grid structure may be regular or irregular (e.g., may be at a first level of coarseness for one portion of the grid structure and a second level of coarseness for another portion). In addition, the second grid structure may be a 3D grid structure.

For each of the edges, a cost (e.g., hard costs such as earthwork and construction costs, and/or a weighted and scaled combination of values from stored cost layers that lay under a portion of the alignment segment) corresponding to an alignment segment that connects the grid points of each edge is computed. It may be noted that if the second grid structure is a 3D grid structure, it allows the computation of costs for a road that connects grid points at certain elevations below or above the ground surface. This means that when computing costs, the elevation of the end point of a prior segment in the path is considered when computing the cost for a subsequent segment. Such a computation is in contrast with a 2D approach wherein each segment's cost is computed in isolation (i.e., the cost is computed at each segment relative to the ground rather than taking the prior segment's elevation into account).

Based on the cost for each of the one or more edges, a first cheapest discrete path on the second grid structure is determined. As the first cheapest discrete path may not be usable for a road/transport alignment (e.g., due to abrupt direction changes from the graph edges), the first cheapest discrete path is smoothed (e.g., by fitting curves) (thereby creating a smoothed cheapest discrete path). Once a smoothed cheapest discrete path is found, a distance between the smoothed cheapest discrete path and the first cheapest discrete path is minimized using an optimization method. The smoothed cheapest discrete path (whose distance from the first cheapest discrete path may be optimized) is then used as the starting alignment.

At step 2208, the starting alignment is optimized using the one or more raster layers. Step 2208 may also include outputting/displaying/utilizing the optimized alignment (e.g., outputting a road design and/or building a road). The optimizing may utilize a covariance matrix adaptation evolution strategy (CMA-ES).

One or more embodiments of the invention perform the optimization via performance of a series of discrete steps. The starting alignment is first used as an evaluating alignment (i.e., an alignment that is to be analyzed via the process). The evaluating alignment is projected along a centerline onto the first grid structure. One or more points where one or more tangents, of the evaluating alignment, intersect with the first grid structure are read. Elevation values (based on the one or more points) are stored to produce a first profile. One or more offset second profiles (to a left and right of the centerline) may also be produced to obtain additional elevation values. The elevation values and a corresponding soft cost value are read. Using the first profile, hard costs that are quantifiable in monetary values are obtained. The soft cost value is added to the hard costs to determine an alignment cost. The soft cost value may be added to the hard cost based on:

$$h(x)+\lambda h(x)s(x)+p(x),$$

where $h(x)$ is the hard costs, $s(x)$ is the soft cost value, $p(x)$ is a penalty cost for violating a constraint, and $\lambda$ is a weight factor that weights the soft cost value relative to the hard costs.

A point of the intersection configuration is changed to provide a different evaluating alignment and the above steps are repeated (for the changed point of intersection configuration) to determine an additional alignment cost. The alignment cost and the additional alignment cost are compared to determine the cheapest alignment cost. The alignment corresponding to the cheapest alignment cost is stored and returned to the user.

In addition to the above, the optimizing may be performed on multiple alignments in parallel utilizing different weights for soft costs.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] American Association of State Highway and Transportation Officials, *A Policy on Geometric Design of Highways and Streets,* 6th edition, Washington, D.C., 2011.

[2] H. H. Bauschke and V. R. Koch, *Projection Methods: Swiss Army Knives for Solving Feasibility and Best Approximation Problems with Halfspaces,* arXiv preprint arXiv: 1301.4506v1, January 2013.

[3] U.S. patent application Ser. No. 14/157,421, filed on Jan. 16, 2014, entitled "DETERMINING FEASIBLE SPLINES WITH ENGINEERING CONSTRAINTS USING PROJECTION METHODS", by Heinze H. Bauschke and Valentin R. Koch, which application claims the benefit under 35 U.S.C. Section 119(e) of U.S. Provisional Patent Application 61/753,338, filed on Jan. 16, 2013.

[4] R. Bellman, *On the approximation of curves by line segments using dynamic programming*, Communications of the ACM, 4(6):284, 1961.

[5] J. Cheng and Y. Lee, *Model for three-dimensional highway alignment*, Journal of Transportation Engineering, 2006.

[6] E. P. Chew, C. J. Goh, and T. F. Fwa, *Simultaneous optimization of horizontal and vertical alignments for highways*, Transportation Research, 23 (5): 315-329, 1989.

[7] E. W. Dijkstra, *A note on two problems in connexion with graphs*, Numerische Mathematik 1, 269-271, 1959.

[8] David H. Douglas and Thomas K. Peucker, *Algorithms for the reduction of the number of points required to represent a digitized line or its caricature*, Cartographica: The International Journal for Geographic Information and Geovisualization, 10(2):112â€"122, 1973.

[9] P. G. Gipps, K. Q. Held, and G. Barnett, *New technologies for transport route selection*, Transportation Research Part C: Emerging Technologies, 9 (2): 135-154, 2001.

[10] M. K. Jha, and P. Schonfeld, *A highway alignment optimization model using geographic information systems*, Transportation Research Part A: Policy and Practice, 38(6): 455-481, 2004.

[11] M. K. Jha, and E. Kim, *Highway route optimization based on accessibility, proximity, and land-use changes*, Journal of Transportation Engineering, 132 (5): 435-439, May 1, 2006.

[12] M. K. Jha, P. Schonfeld, J. Jong, and E. Kim, *Intelligent Road Design*, Advances in Transport, WIT Press, 2006.

[13] J. Jong, M. Jha, and P. Schonfeld, *Preliminary highway design with genetic algorithms and geographic information systems*, Computer-Aided Civil and Infrastructure Engineering, 15: 261271, 2000.

[14] J. Jong, and P. Schonfeld, *An evolutionary model for simultaneously optimizing three-dimensional highway alignments*, Transportation Research Part B: Methodological, 37: 107128, 2003.

[15] M. W. Kang, P. Schonfeld, and J.-C. Jong, *Highway alignment optimization through feasible gates*, Journal of Advanced Transportation, 41 (2): 115144, 2007.

[16] E. Kim, M. K. Jha, and B. Son, *Improving the computational efficiency of highway alignment optimization models through a stepwise genetic algorithms approach*, Transportation Research Part B: Methodological, 39 (4): 339-360, 2005.

[17] U.S. patent application Ser. No. 13/626,451, filed on Sep. 25, 2012, by Valentin R. Koch, entitled "Road Design Optimization", which application claims the benefit under 35 U.S.C. Section 119(e) of U.S. Provisional Application Ser. No. 61/539,793, filed on Sep. 27, 2011, by Valentin R. Koch, entitled "ROAD DESIGN OPTIMIZATION."

[18] H. T. Kung, and F. Luccio, and F. P. Preparata, *On finding the maxima of a set of vectors*, Journal of the ACM, 22 (4) : 469-476, 1975.

[19] Y. Lee, Y. Tsou, and H. Liu, *An Optimization Method for Designing the Highway Horizontal Alignment*, Computing in Civil Engineering, 261 (1): 1-8, 2007.

[20] Y. Lee, Y. Tsou, and H. Liu, *Optimization Method for Highway Horizontal Alignment Design*, Journal of Transportation Engineering, 135 (4): 217, 2009.

[21] R. A. A. Nobrega, C. G. O'Hara, R. Sadasivuni and J. Dumas *Bridging decision-making process and environmental needs in corridor planning*, Management of Environmental Quality: An International Journal, 20 (6): 622-637, 2009.

[22] D. Trietsch, *A family of methods for preliminary highway alignment*, Transportation Science, 21(1): 17-25, 1987.

What is claimed is:

1. A computer-implemented method for optimizing transport alignments, comprising:
   reading terrain data, constraint data, and cost data;
   organizing and storing one or more terrain pixels, comprising elevation values, in a first grid structure comprising rows and columns to enable efficient access to each terrain pixel, wherein the first grid structure comprises a matrix;
   creating one or more raster layers of a same dimension and orientation as the first grid structure;
   obtaining a horizontal transportation starting alignment by:
      determining a first cheapest discrete path on a second grid structure that overlays the terrain data, constraint data, and cost data, wherein the second grid structure comprises a grid graph, wherein:
         in the grid graph, one or more edges, of the second grid structure, connect grid points;
         each of the one or more edges corresponds to a cost;
         the first cheapest discrete path is determined based on the cost for each of the one or more edges;
      smoothing the first cheapest discrete path, wherein the smoothing fits curvature to the first cheapest discrete path;
      minimizing a distance between the smoothed first cheapest discrete path and the first cheapest discrete path using an optimization method, wherein the optimization method uses a cost function that comprises:
         a measured distance that measures a similarity between the smoothed first cheapest discrete path and the first cheapest discrete path; and
         a penalty cost that occurs due to a violation of design constraints; and
   optimizing the starting horizontal transport alignment using the one or more raster layers.

2. The computer-implemented method of claim 1, wherein a first raster layer of the one or more raster layers comprises water data.

3. The computer-implemented method of claim 2, wherein a second raster layer of the one or more raster layers comprises an avoidance zone.

4. The computer-implemented method of claim 1, wherein a first layer of the one or more of the raster layers comprises hard costs that are quantifiable in monetary values.

5. The computer-implemented method of claim 1, wherein a first layer of the one or more of the raster layers comprises soft costs that are not quantifiable in monetary values.

6. The computer-implemented method of claim 1, wherein the obtaining a starting horizontal transport alignment comprises:
   (a) obtaining a start point and an end point;
   (b) producing the second grid structure wherein:
      (1) the second grid structure is coarser than the first grid structure; and (2) one or more edges, of the second grid structure, connect grid points horizontally, vertically, and diagonally;

(c) for each of the one or more edges:
(1) computing a cost corresponding to an alignment segment that connects the grid points of each edge;

(d) determining, based on the cost for each of the one or more edges, the first cheapest discrete path on the second grid structure;

(e) smoothing the first cheapest discrete path to create the smoothed cheapest discrete path; and (f) selecting the smoothed cheapest discrete path as the starting horizontal transport alignment.

7. The computer-implemented method of claim 6, wherein the cost comprises earthwork and construction costs.

8. The computer-implemented method of claim 6, wherein the cost comprises a weighted and scaled combination of values from stored cost layers that lay under a portion of the alignment segment.

9. The computer-implemented method of claim 6, wherein the selecting the smoothed cheapest discrete path as the starting horizontal transport alignment comprises:
taking the smoothest cheapest discrete path and minimizing a distance between the smoothest cheapest discrete path and the first cheapest discrete path using an optimization method.

10. The computer-implemented method of claim 1, wherein the optimizing utilizes a covariance matrix adaptation evolution strategy (CMA-ES).

11. The computer-implemented method of claim 1, wherein the optimizing comprises:
(a) utilizing the starting horizontal transport alignment as an evaluating alignment;
(b) projecting the evaluating alignment along a centerline onto the first grid structure;
(c) reading one or more points where one or more tangents, of the evaluating alignment, intersect with the first grid structure;
(d) storing, based on the one or more points, one or more elevation values to produce a first profile;
(e) reading the one or more elevation values and a corresponding soft cost value, wherein the corresponding soft cast value cannot be measured as a monetary value and cannot be directly compared to hard costs;
(f) obtaining, using the first profile, hard costs that are quantifiable in monetary values;
(g) adding the soft cost value to the hard costs to determine an alignment cost;
(h) changing a point of intersection configuration to provide a different evaluating alignment and repeating steps (b)-(g) for the changed point of intersection configuration to determine an additional alignment cost;
(i) comparing the alignment cost and the additional alignment cost to determine the cheapest alignment cost;
(j) storing the alignment corresponding to the cheapest alignment cost; and
(k) returning the stored alignment to a user.

12. The computer-implemented method of claim 11, further comprising:
producing one or more offset second profiles, to a left and right of the centerline, to obtain additional elevation values.

13. The computer-implemented method of claim 11, wherein:
the optimizing is performed on multiple alignments in parallel utilizing different weights for soft costs.

14. The computer-implemented method of claim 11, wherein the adding the soft cost value to the hard costs comprises:

$$h(x)+\lambda h(x)s(x)+p(x),$$

where $h(x)$ is the hard costs, $s(x)$ is the soft cost value, $p(x)$ is a penalty cost for violating a constraint, and $\lambda$ is a weight factor that weights the soft cost value relative to the hard costs.

15. A non-transitory computer readable storage medium encoded with computer program instructions which when accessed by a computer cause the computer to load the program instructions to a memory therein creating a special purpose data structure causing the computer to operate as a specially programmed computer, executing a method of optimizing transport alignments, comprising:
reading, in the specially programmed computer, terrain data, constraint data, and cost data;
organizing and storing, in the specially programmed computer, one or more terrain pixels comprising elevation values in a first grid structure comprising rows and columns to enable efficient access to each terrain pixel, wherein the first grid structure comprises a matrix;
creating, in the specially programmed computer, one or more raster layers of a same dimension and orientation as the first grid structure;
obtaining, in the specially programmed computer, a starting horizontal transport alignment by:
determining a first cheapest discrete path on a second grid structure that overlays the terrain data, constraint data, and cost data, wherein the second grid structure comprises a grid graph, wherein:
in the grid graph, one or more edges, of the second grid structure, connect grid points;
each of the one or more edges corresponds to a cost;
the first cheapest discrete path is determined based on the cost for each of the one or more edges;
smoothing the first cheapest discrete path, wherein the smoothing fits curvature to the first cheapest discrete path; and
minimizing a distance between the smoothed first cheapest discrete path and the first cheapest discrete path using an optimization method, wherein the optimization method uses a cost function that comprises:
a measured distance that measures a similarity between the smoothed first cheapest discrete path and the first cheapest discrete path; and
a penalty cost that occurs due to a violation of design constraints; and
optimizing, in the specially programmed computer, the starting horizontal transport alignment using the one or more raster layers.

16. The non-transitory computer readable storage medium of claim 15, wherein a first raster layer of the one or more raster layers comprises water data.

17. The non-transitory computer readable storage medium of claim 16, wherein a second raster layer of the one or more raster layers comprises an avoidance zone.

18. The non-transitory computer readable storage medium of claim 15, wherein a first layer of the one or more of the raster layers comprises hard costs that are quantifiable in monetary values.

19. The non-transitory computer readable storage medium of claim 15, wherein a first layer of the one or more of the raster layers comprises soft costs that are not quantifiable in monetary values.

20. The non-transitory computer readable storage medium of claim 15, wherein the obtaining a starting horizontal transport alignment comprises:
(a) obtaining, in the specially programmed computer, a start point and an end point;
(b) producing, in the specially programmed computer, the second grid structure wherein:
 (1) the second grid structure is coarser than the first grid structure; and
 (2) one or more edges, of the second grid structure, connect grid points horizontally, vertically, and diagonally;
(c) for each of the one or more edges:
 (1) computing, in the specially programmed computer, a cost corresponding to an alignment segment that connects the grid points of each edge;
(d) determining, in the specially programmed computer, based on the cost for each of the one or more edges, a cheapest path on the second grid structure;
(e) smoothing, in the specially programmed computer, the cheapest path; and
(f) selecting, in the specially programmed computer, the smoothed cheapest path as the starting horizontal transport alignment.

21. The non-transitory computer readable storage medium of claim 20, wherein the cost comprises earthwork and construction costs.

22. The non-transitory computer readable storage medium of claim 20, wherein the cost comprises a weighted and scaled combination of values from stored cost layers that lay under a portion of the alignment segment.

23. The non-transitory computer readable storage medium of claim 20, wherein the selecting the smoothed cheapest discrete path as the starting horizontal transport alignment comprises:
taking the smoothest cheapest discrete path and minimizing a distance between the smoothest cheapest discrete path and the first cheapest discrete path using an optimization method.

24. The non-transitory computer readable storage medium of claim 15, wherein the optimizing utilizes a covariance matrix adaptation evolution strategy (CMA-ES).

25. The non-transitory computer readable storage medium of claim 15, wherein the optimizing comprises:
(a) utilizing, in the specially programmed computer, the starting horizontal transport alignment as an evaluating alignment;
(b) projecting, in the specially programmed computer, the evaluating alignment along a centerline onto the first grid structure;
(c) reading, in the specially programmed computer, one or more points where one or more tangents, of the evaluating alignment, intersect with the first grid structure;
(d) storing, in the specially programmed computer, based on the one or more points, one or more elevation values to produce a first profile;
(e) reading, in the specially programmed computer, the one or more elevation values and a corresponding soft cost value;
(f) obtaining, in the specially programmed computer, using the first profile, hard costs that are quantifiable in monetary values;
(g) adding, in the specially programmed computer, the soft cost value to the hard costs to determine an alignment cost;
(h) changing, in the specially programmed computer, a point of intersection configuration to provide a different evaluating alignment and repeating steps (b)-(g) for the changed point of intersection configuration to determine an additional alignment cost;
(i) comparing, in the specially programmed computer, the alignment cost and the additional alignment cost to determine the cheapest alignment cost;
(j) storing, in the specially programmed computer, the alignment corresponding to the cheapest alignment cost; and
(k) returning, in the specially programmed computer, the stored alignment to a user.

26. The non-transitory computer readable storage medium of claim 25, further comprising:
producing one or more offset second profiles, to a left and right of the centerline, to obtain additional elevation values.

27. The non-transitory computer readable storage medium of claim 25, wherein:
the optimizing is performed on multiple alignments in parallel utilizing different weights for soft costs.

28. The non-transitory computer readable storage medium of claim 25, wherein the adding the soft cost value to the hard costs comprises:

$$h(x)+\lambda h(x)s(x)+p(x),$$

where $h(x)$ is the hard costs, $s(x)$ is the soft cost value, $p(x)$ is a penalty cost for violating a constraint, and $\lambda$ is a weight factor that weights the soft cost value relative to the hard costs.

29. A computer-implemented method for optimizing transport alignments, comprising:
reading terrain data, constraint data, and cost data, wherein the cost data comprises soft costs and hard costs, wherein the soft costs cannot be expressed in monetary values and the hard costs are expressed in monetary values;
organizing and storing one or more terrain pixels, comprising elevation values, in a first grid structure comprising rows and columns to enable efficient access to each terrain pixel;
creating one or more raster layers of a same dimension and orientation as the first grid structure;
obtaining a starting alignment; and
optimizing the starting alignment using the one or more raster layers with an Evolutionary Strategy method based on covariance matrix adaptation (CMA-ES), wherein:
 the Evolutionary Strategy method uses directional information based on an evaluation of the cost data:
 the Evolutionary Strategy method repeatedly changes a Points of Intersection (PI) configuration and a curve radius of the starting alignment;
 the Evolutionary Strategy method evaluates a soft cost of a new road alignment;
 the Evolutionary Strategy adds the soft costs to a total cost by scaling the soft costs as a multiple of the hard costs, and by weighing the scaled soft costs with respect to the hard costs;
 the Evolutionary Strategy method optimizes the starting alignment by minimizing a distance between a smoothed first cheapest discrete path and a first cheapest discrete path using a cost function that comprises:
- a measured distance that measures a similarity between the smoothed first cheapest discrete path and the first cheapest discrete path; and
- a penalty cost that occurs due to a violation of design constraints.

30. The computer-implemented method of claim 29, wherein:
the optimizing stops upon a given solving time expiring.

31. The computer-implemented method of claim 29, wherein:
the optimizing stops upon exceeding a given number of iterations.

32. The computer-implemented method of claim 29, wherein:
the optimizing stops when an improvement in the total costs is less than a tolerance.

33. The computer-implemented method of claim 29, wherein:
the optimizing stops when a change in the starting alignment is smaller than a tolerance.

\* \* \* \* \*